United States Patent [19]
Amersfoort et al.

[11] Patent Number: 5,629,992
[45] Date of Patent: May 13, 1997

[54] PASSBAND FLATTENING OF INTEGRATED OPTICAL FILTERS

[75] Inventors: Martin R. Amersfoort, Eatontown; Julian B. D. Soole, Edison, both of N.J.

[73] Assignee: Bell Communications Research, Inc., Morristown, N.J.

[21] Appl. No.: 528,447

[22] Filed: Sep. 14, 1995

[51] Int. Cl.$^6$ ........................................ G02B 6/24
[52] U.S. Cl. ............................ 385/15; 385/14; 385/17
[58] Field of Search ............................ 385/15, 17, 14

[56] References Cited

U.S. PATENT DOCUMENTS

| | | | |
|---|---|---|---|
| 5,002,350 | 3/1991 | Dragone | 350/96.15 |
| 5,136,671 | 8/1992 | Dragone | 385/46 |

OTHER PUBLICATIONS

Soldano et al, "Planar Monomode Optical Couplers Based on Multimode Interference Effects", Journal of Lightwave Technology, vol. 10 No. 12, pp. 1843–1850. Dec. 1992.
van Roijen et al, "Compact InP–based ring lasers employing multimode interference couplers and combiners", Appl. Phys. Lett. 64 (14), pp. 1753–1755. Apr. 1994.
Adar et al., "Broad–Band Array Multiplexers Made with Silica Waveguides on Silicon," *Journal of Lightwavbe Technology*, vol. 11, 1993, pp. 212–218 (Feb.).
Amersfoort et al., "Phased–array wavelength demultiplexer with flattened wavelength response," *Electronics Letters*, vol. 30, 1994, pp. 300–302 (Feb.).
Brackett et al., "A Scalable Multiwavelength Multihop Optical Network: A Proposal for Research on All–Optical Networks" *Journal of Lightwave Technology*, vol. 11, 1993, pp. 736–753 (May/Jun.).
Cremer et al., "Grating spectrograph in In GaAsP/InP for dense wavelength division multiplexing," *Applied Physics Letters*, 1991, pp. 627–629 (Aug.).
Girton et al., "20GHz electro–optic polymer Mach–Zehnder modulator," *Applied Physics Letters*, vol. 58, 1991, pp. 1730–1732 (Apr.).

Glance et al., "Applications of the Integrated Wavegtuide Grating Router," *Journal of Lightwave Technology*, vol. 12, 1994, pp. 957–961 (Jun.).
Ishida et al., "Multichannel Frequency–Selective Switch Employing an ARrayed–Waveguide Grating Multiplexer with Fold–Back Optical Paths," *IEEE Photonics Technology Letters*, vol. 6, 1994, pp. 1219–1221 (Oct.).
Laube et al., "Selective Area Growth of Q/Q–MQW Structures for Active/Passive 2 ×2 Space Switch Matrices," *Proceedings 7th European Conference on Integrated Optics*, Apr. 3–6, 1995, pp. 527–530.
Marcuse, *Theory of Dielectric Optical Waveguides*, 2d ed., (Academic, 1974), pp. 1–19 (no month avail.).

(List continued on next page.)

*Primary Examiner*—Rodney B. Bovernick
*Assistant Examiner*—Yisun Song
*Attorney, Agent, or Firm*—Joseph Giordano; James W. Falk

[57] ABSTRACT

An optical filter, such as a wavelength–division multiplexer, demultiplexer, or optical router, in which several single-mode waveguides are coupled to the sides of an optical interaction region containing a wavelength dispersive element that collects light from one or more input waveguides inputting light to the interaction region and disperses it according to wavelength to one or more output waveguides outputting wavelength-separated light. According to the invention, a multi-moded waveguide is interposed between one or more of the single-moded waveguides and the optical interaction region. It has a predetermined length to create at one end a multiply peaked image of a singly peaked profile presented to it at the other end, thus being a multi-mode interference (MMI) filter that presents a flatter filter profile at the interface between the MMI and the optical interaction region and affords reduced filter sensitivity to wavelength drift of an optical signal. The wavelength dispersive element is preferably an arrayed waveguide grating between two optical interaction regions at the input and output sides. Several optical switches, multiplexers, and add-drop circuits have architectures that beneficially use the filter of the invention.

45 Claims, 10 Drawing Sheets

OTHER PUBLICATIONS

"Mottier, Integrated optics at the Laboratoire d'Electroniqe, de Technologie et d'Instrumentation," *International Journal of Optoelectronics*, vol. 9, 1994, pp. 125–134 (no month available).

Okamoto et al., "Arrayed–waveguide grating multiplexer with flat spectral response," *Optics Letters*, vol. 20, 1995, pp. 43–45 (Jan.).

Okamoto et al., "16–channel optical add/drop multiplexer using silica–based arrayed–waveguide gratings," *Electronics Letters*, vol. 1995, pp. 723–724 (Apr.).

Poguntke et al., "High–performance InP reflection–grating wavelength multiplexer," *Electronics Letters*, 1994, pp. 512, 513 (Mar.).

Smit, "New focusing and dispersive planar component based on an optical phased array,", *Electronics Letters*, vol. 24, 1988, pp. 385–386 (Mar.).

Soldano, *Multimode Interference Couplers: Design and Applications*, Delft University Press, 1994, pp. 9–35, 57–62, 84–89 (no month available).

Soldano et al., "Optical Multi–Mode Interference Devices Based on Self–Imaging: Principles and Applications", *Journal of Lightwave Technology*, vol. 13, 1995, pp. 615–627 (Apr.).

Steenbergen et al., "4–channel wavelength flattened demultiplexer integrated with photodetectors," *Proceedings 7th European Conference on Integrated Optics* Apr. 3–6, 1995, Delft, The Netherlands, pp. 271–274.

Suzuki et al., "Multichannel optical wavelength selective switch with arrayed–waveguide grating multiplexer," *Electronics Letters*, vol. 30, 1994, pp. 1091, 1092 (Jun.).

Syms, "Silica–on silicon integrated optics," *Advances in Integrated Optics*, eds. Martellucci et al., Plenum Press, 1994, pp. 121–150 (no month available).

Tachikawa et al., "Arrayed–waveguide grating add–drop multiplexer with loop–back optical paths," *Electronics Letters*, 1993, vol. 29, pp. 2133, 2134 (Nov.).

Takahashi et al., "Arrayed–waveguide for wavelength division multi–demultiplexer with nanmetre resolution," *Electronics Letters*, vol. 26, 1990, pp. 87, 88 (Jan.).

Thompson et al., "Fabrication of a Low Loss Inegrated InGaAsP/InP Demultiplexer using $CH_4/H_2/CO_2$ Reactive Ion Etching," *European Conference on Integrated Optics*, 1993 (no month available).

Vance et al., "Asymmetric adiabatic multiprong for mode–multiplexed systems," *Electronics Letters*, vol. 24, pp. 2134–2135 (Nov. 1993).

Vellekoop et al., "Four–Channel Inegrated–Optic Wavelength Demultiplexer With Weak Polarization Dependence," *Journal of Lightwave Technology*, vol. 9, 1991, pp. 310–314 (Mar.).

Vinchant et al., "Low driving voltage or current digital optical switch on InP for multiwavelength system applications," *Electronics Letters*, vol. 28, 1992, pp. 1135, 1136 (Jun.).

Young et al., "A 16×1 Wavelength Division Multiplexer with Integrated Distributed Bratgg Reflector Lasers and Electroabsorption Modulators", *IEEE Photonics Technology Letters*, 5, 1993, pp. 908–910 (Aug.).

Zah et al., "Multiwavelength light source with integrated DFB laser Array and star coupler for WDM lightwave communications," *International Journal of High Speed Electronics and Systems*, vol. 3, 1994, pp. 91–109 (no month avail.).

Zirngibl et al., "Demonstration of a 15×15 Arrayed Waveguide Multiplexer on InP," *IEEE Photonics Technology Letters*, vol. 4, 1992, pp. 1250–1253 (Nov.).

PASSBAND FLATTENING OF INTEGRATED OPTICAL FILTERS

GOVERNMENT INTEREST

This invention was made with Government support under Agreement No. MDA 972-94-3-0027 awarded by ARPA. The government has certain rights in the invention.

FIELD OF THE INVENTION

The invention relates generally to opto-electronic integrated circuits. In particular, the invention relates to optical wavelength multiplexers and demultiplexers, particularly as implemented in opto-electronic integrated circuits.

BACKGROUND OF THE INVENTION

Telecommunication and other data networks are rapidly evolving to rely upon optical fiber as the transmission medium. Originally, networks utilizing optical fiber were configured such that fiber simply replaced copper wire on long links so that optical-electrical conversion was required at ends of the optical fiber terminating in the nodes and switches of the network. More recently, all-optical network architectures have been proposed in which optical signals are switched among different fibers of the network without the necessity of converting the optical signal to electrical form.

One popular architecture involves wavelength division multiplexing (WDM) in which multiple optical carriers carrying data signals directed to different destinations are impressed upon a single optical fiber. If such a WDM system is to avoid intermediate conversion to electrical signals, it should include an optical router 10 of the general function illustrated in FIG. 1. Two input fibers 12 carry respective sets of wavelength channels $\lambda_1$ $\lambda_2$, $\lambda_3$, $\lambda_4$ and $\lambda'_1\lambda'_2$, $\lambda'_3$, $\lambda'_4$. In the following discussion, differentiation based on wavelength or on frequency will be considered equivalent since they are related through the dielectric constant or refractive index of the local material. The two sets of wavelength channels have nominally the same optical wavelengths but carry different data signals. The router 10 is capable, by mechanisms to be explained later, to selectively route the wavelength channels to different output fibers 14. Because of the nominal equality of the two sets of wavelengths, the router 10 directs, for instance, the wavelength channel $\lambda_1$ to one of the output channels and the channel $\lambda'_1$, to the other.

One type of optical router 10 includes an optical wavelength routing element 20 illustrated schematically in FIG. 2. In this context, an optical routing element is a wavelength division switch, multiplexer or demultiplexer that physically routes optical signals according to their wavelength, the wavelength usually being associated with an optical carrier frequency. A single-moded input waveguide 21 injects light through an optical focussing element 22 into an optical interaction region 28 in which the light spreads and hits a frequency-dispersive element 24. For purposes of this discussion, an optical interaction region is a laterally (horizontally) unconfined planar waveguiding region in which an introduced waveguide field can propagate freely within the plane. A localized mode field introduced into such a region will generally broaden as it propagates through it in the usual mode-expansion manner of unconfined beams. The region may also serve as a space in which fields may be localized, and in which imaging optics are employed to produce a focussed image from a spatially dispersed field.

The light of different wavelengths $\lambda_1$, $\lambda_2$, $\lambda_3$, and $\lambda_4$ diffracts from or otherwise interacts with the frequency-dispersive element 24 into separate directions so as to couple to respective single-moded output waveguides 26 through focusing elements 25. This figure is meant to be illustrative only. The frequency-dispersive element 24 acts to spatially separate portions of a light beam according to their frequencies. It can assume several other forms, an important one of which is an arrayed waveguide to be described later. The frequency-dispersive element is used for other functions in a WDM network, such as a multiplexer at a multi-wavelength transmitting station and a demultiplexer at a multi-wavelength receiving station.

The frequency-dispersive element in cooperation with the other elements acts as a wavelength filter. Illustrative transmission spectra $T(\lambda)$ for two neighboring wavelength channels at their respective output waveguides 26 are given in FIG. 3. Each peak 30 has a typically gaussian-like (bell-like) shape with a peak wavelength designed for the design wavelength $\lambda_i$. The channel spacings $\Delta\lambda_{SP}$ are determined by the overall network considerations. For a determined value of $\Delta\lambda_{SP}$, the passband width $\delta\lambda$ is generally arranged to be large as possible but to be as small enough to provide sufficiently small crosstalk between the channels. At the present, spacings of 0.8 and 1.6 nm are typically used for transmission systems operating at 1.5 µm although specialized devices have been demonstrated with even smaller spacings.

The frequency-dispersive element presents difficulties in a WDM network, particularly one in which a signal may originate from many different transmitters and which then typically travels through many routers. Each of the transmitting lasers emitting at a channel wavelength $\lambda_i$ (and there may be very many of them at geographically distant points) must transmit within a given fraction of the allotted bandwidth $\delta\lambda$. However, these lasers tend to drift for a number of reasons including variation in ambient temperature, aging, and other reasons. The bandwidth $\delta\lambda$ cannot be increased without increasing the wavelength spacing $\Delta\lambda_{SP}$ and hence decreasing the total number of channels, that is, the total fiber throughput as system considerations, such as amplifier bandwidths, generally limit the total wavelength span covered by all channels. Even moderate drifts of the laser emission from the peak of a filter transmission curve introduces difficulties. A laser signal at the transmission peak 32 exits the router with larger amplitude than one only slightly down the side of the bell-shaped curve. This difference is multiplied many times as signals traverse many routers, and the difference depends not only upon which laser originated the light but also upon the particular routers the signal has passed through as the filter characteristics vary slightly from one to the next for a number of reasons including variation of ambient temperature, aging, and differences in fabrication, and other reasons so that corrections are difficult when the network interconnects are changing fairly rapidly.

Aspects of this problem have been already recognized. It is desired that the frequency-dispersive element have flat band transmission spectra, such as those illustrated in FIG. 4. Thereby, the laser frequency could drift within the width of the flattened top 36 without effect upon the system. Solutions have been provided for multi-wavelength detectors. Steenberger et al. in "4-channel wavelength flattened demultiplexers integrated with photodetectors," *Proceedings ECIO*, Apr. 3–6, 1995, Delft, Netherlands, pp. 271–274 (ISBN 90-407-111-9) have disclosed substituting multi-moded output waveguides 26 for the single-moded waveguides in FIG. 2. The optical detectors are then placed at the end of the multi-moded waveguides distant from the frequency-dispersive element. The spectrum of transmission out through a multi-moded waveguide is much flatter than that through a single-moded waveguide. While single-moded waveguides are characterized by the optical power transmitted by a single, fundamental mode, multi-mode waveguide according to the invention is characterized by the total power transmitted through the waveguide. The power transfer into a multi-moded waveguide from a wavelength dispersing region has a much flatter wavelength characteristic than does the power transfer from a similar region into a single-moded waveguide. However, such a solution is not appropriate for communication networks that require long-wavelength transmission to be done over single-moded fiber. The inefficient and unpredictable coupling from multi-moded output guides on the integrated circuit chip to single-moded fiber waveguides introduces excessive loss into the network and may introduce additional wavelength dependence.

Thus, no solution has been found which is appropriate for communications networks, particularly for routers.

Therefore, it is desired to provide a frequency-dispersive element that has a flattened wavelength response but that is efficiently coupled to single-moded fibers.

SUMMARY OF THE INVENTION

The invention can be summarized as a frequency-dispersive device, such as a multiplexer, demultiplexer, or router, receiving light from one or more input waveguides and dispersing it according to frequency to one or more output waveguides. In the usual telecommunication implementation, these waveguides suppod only a single optical mode. According to the invention, the end of one or more of the waveguides facing an interaction region about the frequency-dispersive element, e.g. a grating, is widened to support a multitude of modes and the length of this section is made such as to be a multi-mode interference (MMI) filter in which multiple images of the single-moded waveguide mode are presented at the interface of the MMI and the interaction region. Thereby, the filter response of the frequency-dispersive device is flattened.

The invention can be advantageously applied to a number of wavelength division switches, a number of which are inventive in their own right. In particular, feedback waveguides can connect multiple outputs of the wavelength dispersive region to corresponding inputs and the separated channels can be switched before returning to the wavelength dispersive region and being recombined into a single output.

The invention can be particularly advantageously applied to a wavelength multiplexer integrated on a chip with an array of lasers emitting at different wavelengths so as to form a wavelength-division multiplexing transmitter.

DETAILED DESCRIPTION OF THE PREFERRED EMBODIMENTS

Theoretical Basis

Figure 1:
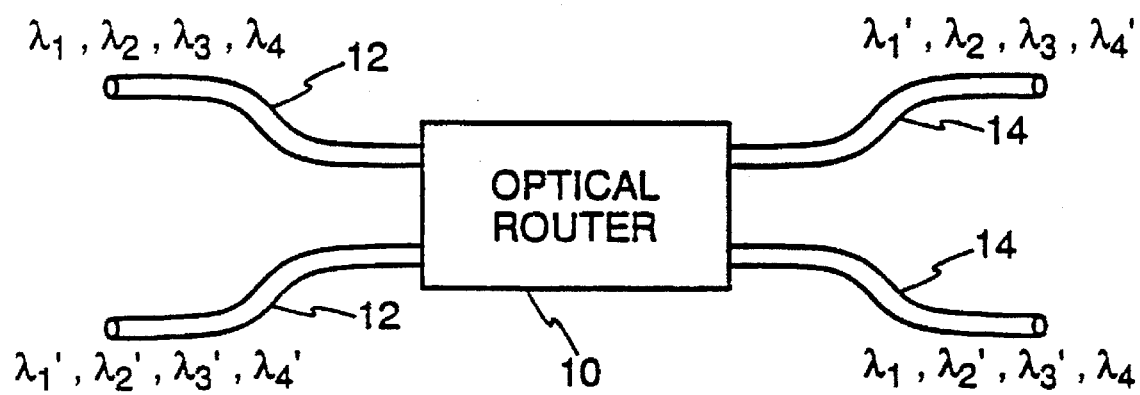
FIG. 1 is a schematic circuit illustration of an optical network element with which the invention may be used.
Figure 2:
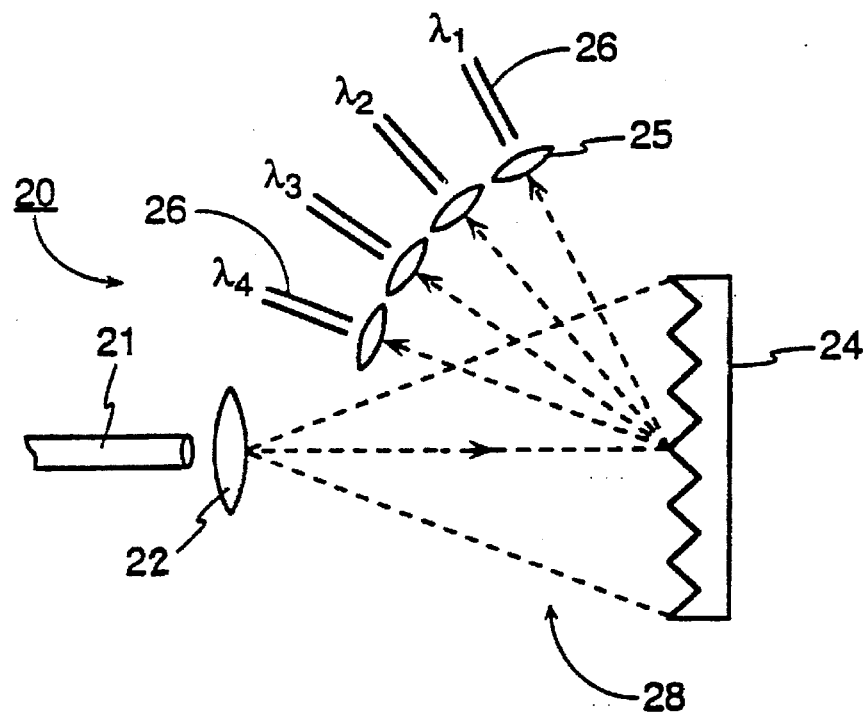
FIG. 2 is a schematic plan view of the basic principle of optical wavelength dispersion.
Figure 3:
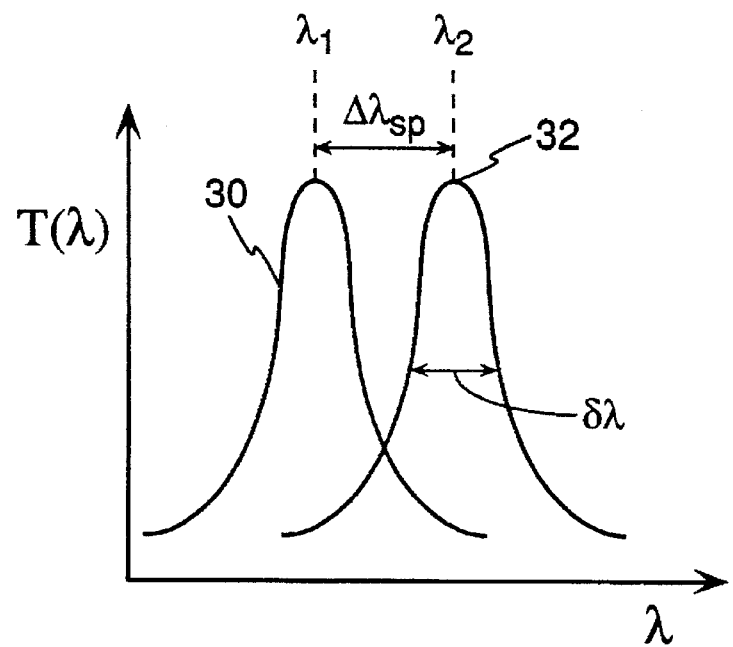
FIG. 3 is a graph of conventional optical filter responses of two neighboring optical channels.
Figure 4:
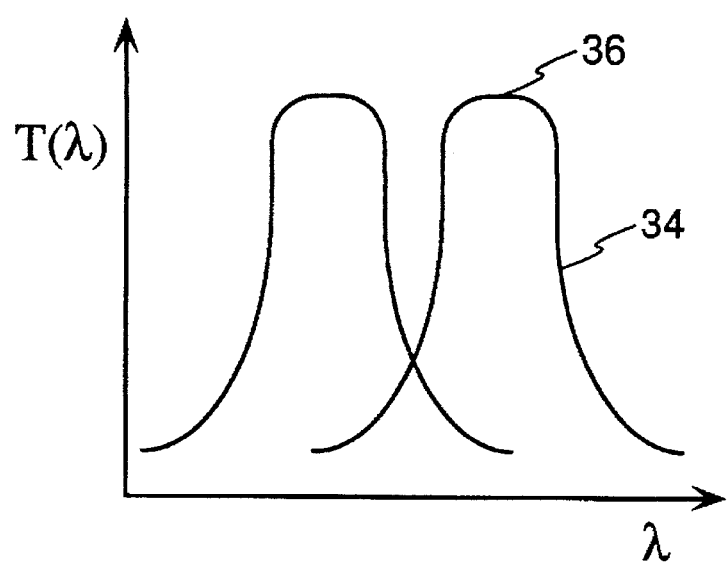
FIG. 4 is a graph of desired flat-topped optical filter responses of two neighboring optical channels.
Figure 5:
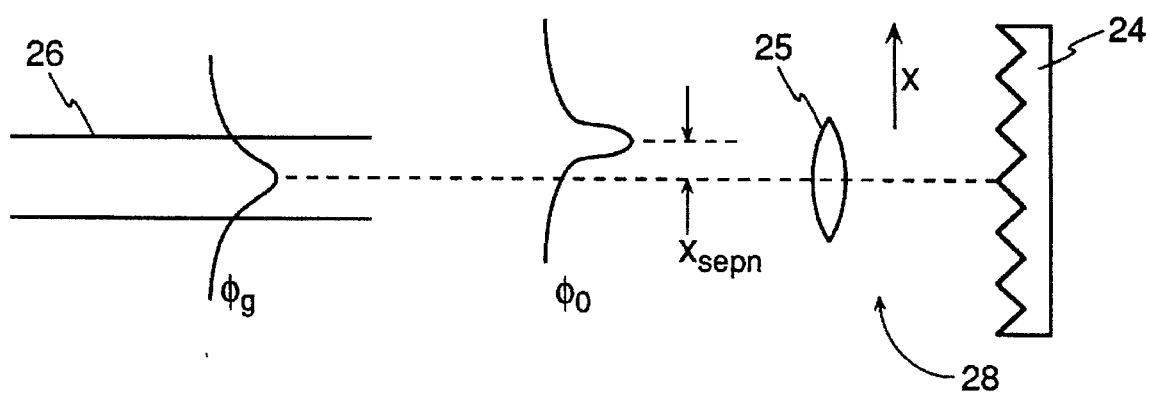
FIG. 5 is an schematic illustration of the coupling between a single-moded waveguide and a laterally localized but geometrically unconfined beam.

The bell-like or gaussian-like lineshape produced in the typical multiplexer or demultiplexer of FIG. 2 is explainable with reference to the schematic illustration of FIG. 5 The single-moded output waveguide 26 is usually a rectangular waveguide integrated on the same chip as the dispersive element 24. It has a modal field characteristic $\phi_g(x)$ represented in FIG. 5. Its spatial mode width $\xi_g$ is closely related to the width of the waveguide 26. The dispersive element 24 and associated lensing components create an image spot from the optical radiation field introduced into the optical interaction region 28 from the unillustrated single-mode input waveguide 21. The image spot has a field characteristics $\phi_o(x)$ with a spatial gaussian mode width of $\xi_o$. Assume that for a wavelength of $\lambda_1$ the peak of the image spot is separated from the middle of the output waveguide 26 and thus from the peak of $\phi_g(x)$ by a separation $x_{sepn}$. The power coupled into the output waveguide 26 at this separation is given by $$Power(x_{sepn}) = [\phi_o(x) \otimes \phi_g(x - x_{sepn})]^2, \quad (1)$$

where the operator "$\otimes$" represents the convolution $$A(x) \otimes B(x - x_1) = \int_{-\infty}^{+\infty} A(x) \cdot B(x - x_1) dx \quad (2)$$

and it is assumed that the two fields are real and normalized.

This response may be translated to the wavelength domain as $$F(\lambda_{sepn}) = \phi_o(\lambda) \otimes \phi_g (\lambda - \lambda_{sepn}), \quad (3)$$

where $\lambda_{sepn}$ is the offset between the center lines of $\phi_o$ and $\phi_g$ expressed in wavelength coordinates and where the wavelength and offset are related by the dispersion $$\eta = \partial x_{sepn}/\partial \lambda_{sepn}, \quad (4)$$

where any offset terms have been normalized into the prefactors.

Typically, waveguides with V-parameters in the range of 2 to 4 are typically used. The value of V provides a measure of the shape of the guide mode and also its degree of confinement, as has been described by D. Marcuse in his text *Theory of Dielectric Optical Waveguides*, 2d ed., (Academic, 1991). For a symmetric three-layer waveguide, it is given by $$V = k_0 \cdot d \cdot \sqrt{n_g^2 - n_s^2}, \quad (5)$$

where $k_o$ is the free-space wavevector, d is the thickness of the guide core, $n_g$ is the refractive index of the guide core, and $n_s$ is the refractive index of the infinite guide claddings. A value of $V<\pi$ indicates that the waveguide is strictly single-moded. In the case of this range of V-parameters between 2 and 4 for both the input and output waveguides, both the spot image function $\phi_o$ and the waveguide mode field $\phi_g$ function have gaussian lineshapes or close thereto. As a result, the filter function $F(\lambda_{sepn})$ also has a gaussian-like lineshape with a width $\lambda_{filter}$ given by the value of the widths of the other two functions, $\Lambda_g$ and $\Lambda_o$, expressed in wavelength coordinates.

$$\lambda_{filter} = \sqrt{\Lambda_g^2 + \Lambda_0^2}. \quad (6)$$

Thus, within this part of the prior art, the filter function $F(\lambda_{sepn})$ has an invariant lineshape, of which only the linewidth $\lambda_{filter}$ can be controlled.

One sort of solution to a portion of this problem has been previously presented in which the output of the coupling region is directed to a linear array of multi-moded waveguides. In a simplest conceptualization of this solution, a multi-moded waveguide is wider than a single-moded waveguide so that a mode of the form of $\phi_o$ shown in FIG. 5 incident on the entrance to that multi-moded waveguide can be spread over a large range of $X_{sepn}$ and still effectively be coupled into the waveguide. Thereby, the throughput function $F(\lambda_{sepn})$ is substantially widened. However, the coupling efficiency between these multi-mode waveguides and subsequent single-mode waveguides coupled thereto is generally poor and unpredictable.

GENERAL DESCRIPTION OF INVENTION

Figure 6:
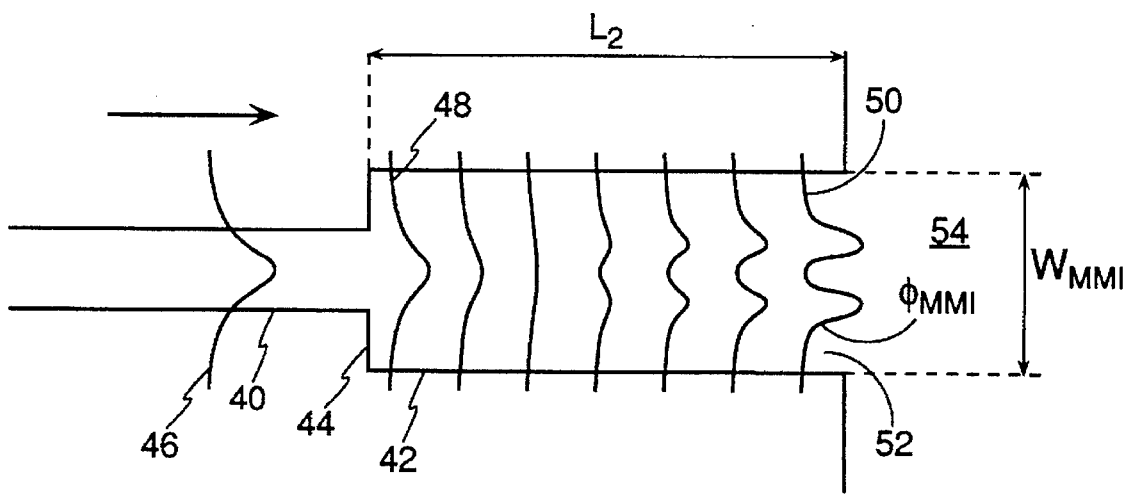
FIG. 6 is a schematic illustration of a multi-mode interference filter producing a multiply peaked output.

The invention is in large part explainable in terms of multi-moded interference (MMI) filters, as described by Soldano in *Multimode Interference Filters: Design and Applications*, (Delft University Press, 1994), pp. 9–35, 57–62, 84–89 and by Soldano et al. In "Optical Multi-Mode Interference Devices Based on Self-Imaging: Principles and Applications," *Journal of Lightwave Technology*, vol. 13, 1995, pp. 615–627. MMI filters rely upon the predictable evolution of the modes within a multi-mode waveguide and the consequentially predictable reconstruction of fields introduced into them at certain (propagation) distances along their length. For example, as illustrated in FIG. 6, a single-moded waveguide 40 is abruptly joined to a multimoded waveguide 42 at an interface 44. The single-moded waveguide 40 supports only a single lateral mode 46 having an envelope mostly confined to the single-moded waveguide 40 but extending somewhat beyond it depending upon the relative values of the refractive indices. By "lateral" is meant within the plane of the underlying substrate while by "transverse" is meant vertical to this plane. The multi-moded waveguide 42 has a sufficient width to support many lateral modes, at least three for the simplest implementations of the invention. Soldano has demonstrated that the envelope of the field profile for the multi-moded waveguide 42, when matched with the boundary condition of a centered single-moded input waveguide 40, develops a number of symmetric self-images of the input waveform at fixed distances along the multi-moded waveguide 42. In particular, the waveform 48, as it propagates along the waveguide 42, initially spreads outs and flattens, but then sharpens into peaks. A double positively peaked waveform 50 $\phi_{MMI}$ is formed at a distance of $$L_2 = \frac{3L_\pi}{8}, \quad (7)$$

from the interface 44, where $L_\pi$ is the beat length of the two lowest-order modes supported by the multi-moded waveguide 42, given by $$L_\pi = \frac{\pi}{\beta_0 - \beta_1}. \quad (8)$$

In these equations, $$\beta_i = \frac{k_i}{k_0}, \quad (9)$$

and $$k_0 = \frac{2\pi}{\lambda_0}, \quad (10)$$

where $\lambda_o$ is the free-space wavelength, and $k_i$ is the wavevector of the I-th guide mode in the direction of propagation. The two-fold images are disposed symmetrically about a center line of the MMI multi-moded waveguide 42 with peak field values occurring at approximately ¼ and ¾ of the width of the double-moded waveguide 42. According to one embodiment of the invention, the length of the MMI multi-moded waveguide 42 is set to approximately $L_2$, and its aperture 52 is disposed adjacent to a coupling region 54 across which the spot image propagates. The coupling region 54 does not laterally confine light so that light exiting the waveguides spreads across the coupling region 54 to irradiate the grating 24. In OEICs, a planar vertical waveguiding structure in the coupling region 54 confines the light in the transverse direction. The light is focussed to form an image of the same spatial form as that at the aperture 52 at the entrance to the output waveguide 62. This light then couples to the guide mode in the waveguide 62 in FIG. 8 to generate the desired filter function $F_{MMI}$.

Figure 7:
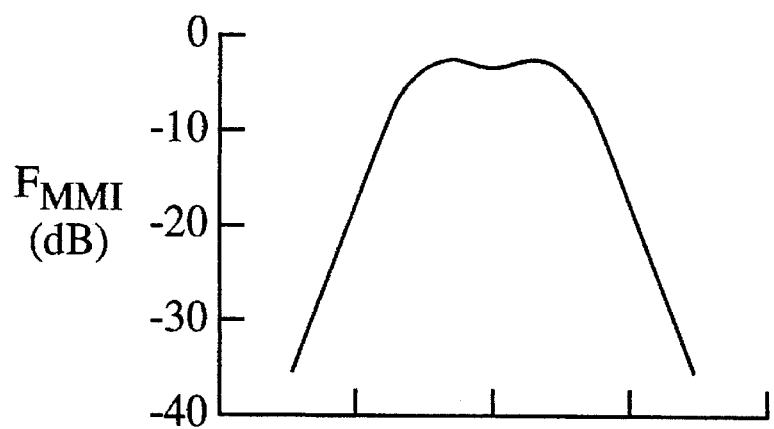
FIG. 7 is a graph of a double-peaked filter function calculated to be produced according to one embodiment of the invention using a double-peaked filter.

It is important to note that the effect of the MMI is not just to widen or even to flatten the field distribution at its output from the waveguide 21. Such a widening or flattening would still leave a relatively sharply peaked MMI filter function $F_{MMI}$. Instead, the doubly peaked field integral from the aperture 52, when imaged at the entrance to the output guide 62, is convoluted with the singly peak waveguide modal field $\phi_g$ in the output guide 62 to produce a substantially flattened filter function $F_{MMI}$, which is flatter than any gaussian function. The effect is most pronounced if the separation of the peaks of the imaged field distribution of $\phi_{MMI}$ is made to approximately equal the width of the singly peaked spot distribution formed by the convolution between the imaged singly peaked component of $\phi_{MMI}$ and the output guide mode $\phi_g$. Such a relative sizing produces a filter function $F_{MMI}$ that has a substantially flat region between the two peaks. Such a filter function $F_{MMI}$ is shown in FIG. 7 and is based upon a calculation.

GENERAL EMBODIMENTS

Figure 8:
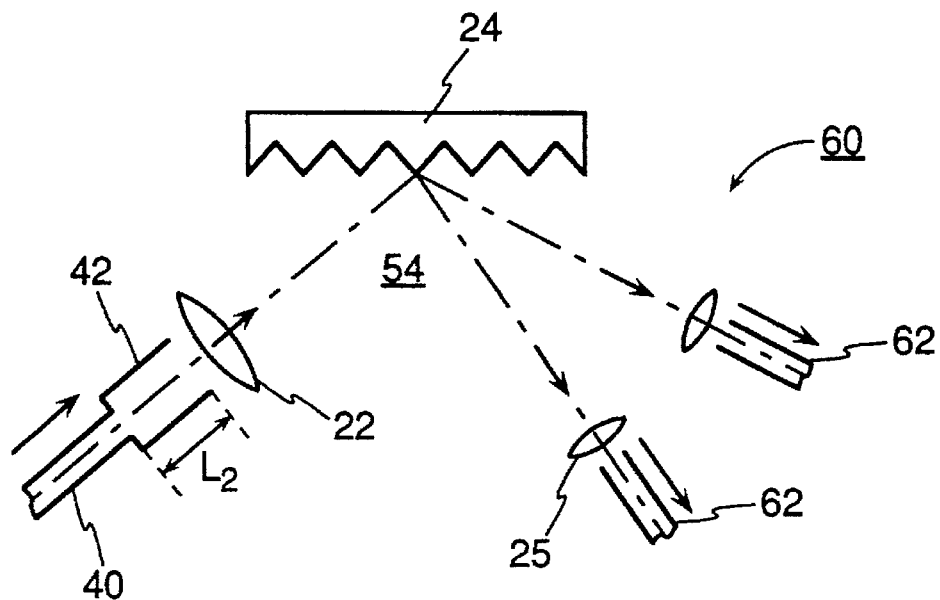
FIG. 8 is a schematic illustration of an embodiment of a demultiplexer of the invention.

The MMI filter of the above discussion can be incorporated in a demultiplexer 60 schematically illustrated in FIG. 8. An optical signal is input on the single-moded waveguide 40 which is coupled to the multi-moded waveguide 42 of length $L_2$. The resultant optical signal is scattered from a dispersion element 24 to one of a number of entry single-moded output waveguides 62. The result is that the image $\phi_{MMI}$ presented to each output waveguide 62 has a double peak and the overall filter function $F_{MMI}$ is substantially flattened.

The optical interactions shown in FIGS. 6 and 8 are linear and reciprocal. As a result, the inputs and outputs can be exchanged. That is, the MMI filter can work equally effectively on either the input waveguide or on the output waveguide. Therefore, the invention can be equally applicable to a demultiplexer 70 schematically illustrated in FIG. 9. A single-moded waveguide 72 inputs an optical signal towards a dispersion element 24 which scatters the light towards multiple output waveguides, each consisting of an entry multi-moded waveguide 74 of length $L_2$ and a single-moded waveguide 76 coupled thereto. The embodiments illustrated schematically in FIGS. 8 and 9 may also be operated with the input and output waveguides used in reverse fashion.

Figure 9:
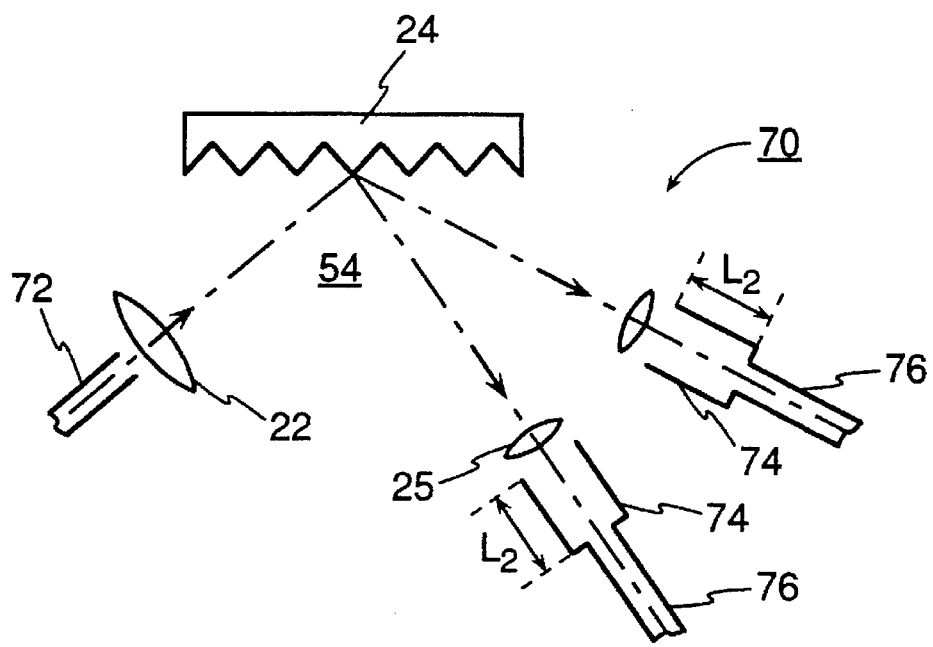
FIG. 9 is a schematic illustration of the coupling between a single-moded waveguide and multiple multi-moded waveguides usable with the invention.

The embodiments of FIGS. 8 and 9 are not limited to only two output (or input) waveguides 62 or 76, but they may have significant number of channels into which the channels are demultiplexed or alternatively from which the channels are multiplexed. Further, the embodiments may both have both multiple inputs and multiple outputs, as is the case for routers usable in communication networks. An example of such a router is illustrated in plan view in FIG. 10. This is a phasedarray multiplexer/demultiplexer 90, such as disclosed by Dragone in U.S. Pat. Nos. 5,002,350 and 5,136,671. An input star coupler 92 couples all signals on plural input waveguides 94 to a plurality of intermediate waveguides 96, the phase lengths of neighbors which vary by a constant or nearly constant amount to thereby form an optical grating. The outputs of the optical grating are coupled via a second star coupler 98 to output waveguides 100. The former patent discloses flared ends to the single-moded waveguides 94, 96 and 100 to increase the overall efficiency. According to the invention, an MMI 102 is placed between the input waveguide 94 and the first star coupler 92 although the multi-moded waveguides could be placed on either the input waveguides 94 or the output waveguides 100 adjacent to the respective star-coupler.

The discussion related to FIG. 6 assumed that the length of the MMI waveguide was $L_2$ so as to cause a two-fold image. As Soldano has stated, N-fold images will be formed at distances $$L_{MMI} = \frac{p}{N} \cdot \left( \frac{3L_\pi}{4} \right). \tag{11}$$

Figure 11:
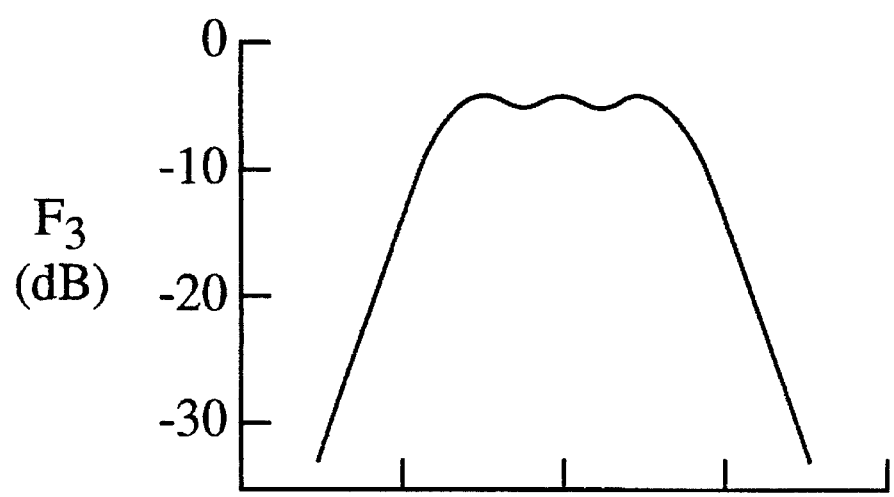
FIG. 11 is a graph of a triple-peaked filter function calculated to be produced according to another embodiment of the invention.

The lowest order mode of p=1 is preferred. However, the invention can advantageously be extended to higher orders of N, which provide even broader flat-topped peaks. FIG. 11 shows a graph of a filter function calculated for N=3. The peak is flatter and broader, but this is accomplished at the expense of coupling loss, for example, 4.5dB loss versus 3.0dB. Residual peaks from the 3-fold image can also be seen in this exemplary calculation.

The multi-mode waveguide does not need to have a length satisfying Equation (7) or Equation (11) to achieve beneficial filter flattening since, as shown in FIG. 6, at other lengths the inputted mode has flattened and spread laterally. However, at or near the lengths of a multi-mode interference filter, the combination of flattening and steep filter edges provided by our general design procedure may be maximized, but it is believed that operating conditions may be calculated which yield performance that is almost as good.

GENERAL DESIGN PROCEDURE

Figure 12:
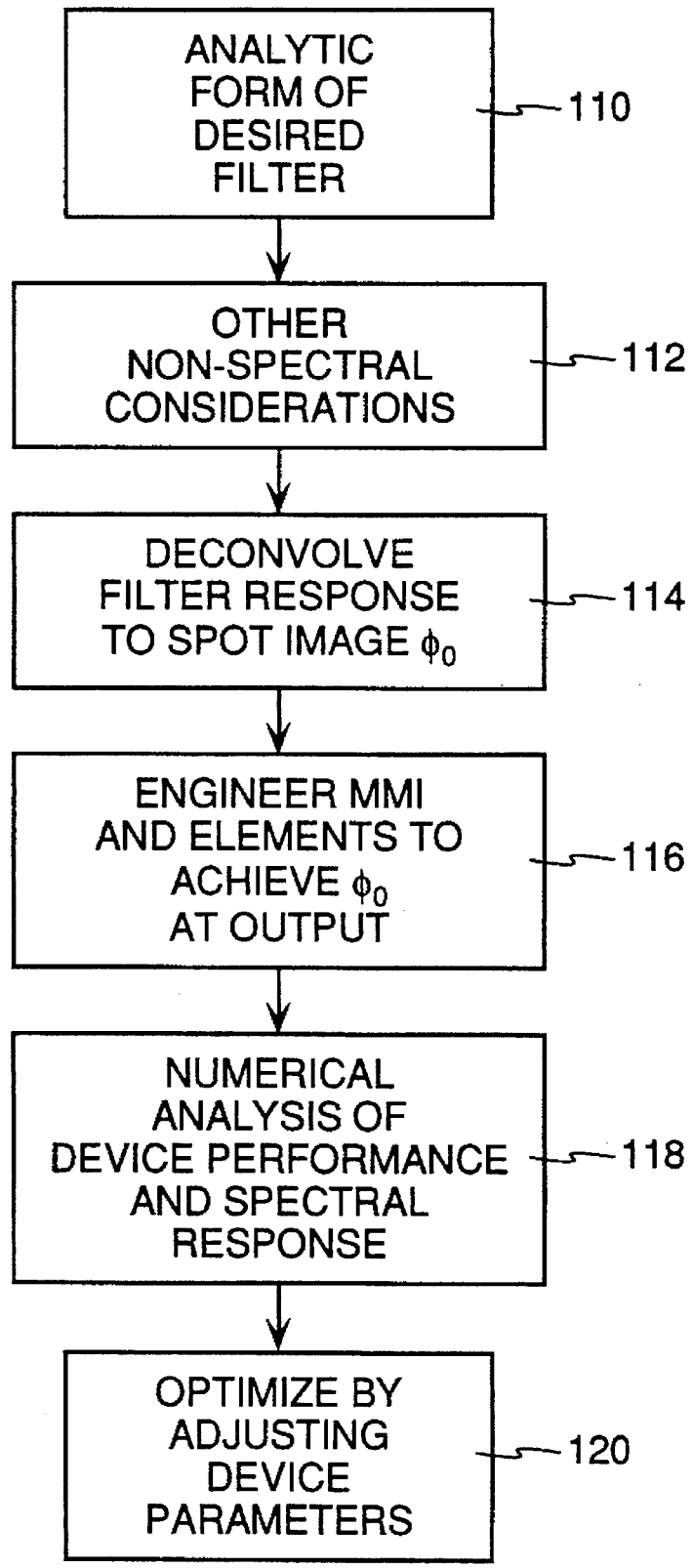
FIG. 12 is a flow chad for the design of one class of embodiments of the invention.

The design of a multiplexer/demultiplexer according to the invention is complex, especially when implemented in semiconducting opto-electronic integrated circuits (OEICs), but the design can be reliably performed by following the following procedure, as described with reference to the flow chart of FIG. 12. This design can be applied to OEICs fabricated from III-V semiconductors and including waveguides formed at or near the surface. It may also be applied to other waveguide materials, such as those based on doped silica or polymer guides.

In a first step 110, determine the filter function that is required, and model the function by an analytic expression. For example, the desired filter function is tailored to give a certain flatband spectral width and to achieve particular transmission levels at certain wavelength spacings from the passband center.

In a second step 112, consider any other constraints which are not directly connected with the device performance, that is, that are not directly related to the spectral filter function. One example would be that a certain mode size, usually large, must be achieved in either the input or output guides to allow for low-loss coupling to or from an optical fiber. Another example would be that a minimum contrast must be maintained between the waveguide core index and the refractive index of the cladding in order to minimize bending losses of curved portions of the waveguide on the OEIC chip.

In a next series of steps, based upon the desired filter response and other constraints and using an analytical model to approximately describe device operation, make an initial determination of suitable device parameters. In particular, in step 114, deconvolve the desired filter response, translated to spatial coordinates at the entrance to the output guide 62, as in FIG. 8, to obtain the required image of $\phi_{MMI}$ from the guide mode $\phi_g$. Then, in step 116, design the MMI, the input guide, and the dispersion elements to obtain the mode $\phi_{MMI}$. Although a 1:1 imaging between the input and output waveguides is simplest, more complex imaging may be performed by the combination of the interaction region and the frequency-dispersive element.

In step 118, use numerical methods to model device performance with the above derived device parameters and to thus obtain the spectral response of the light transmitted through the device. Such a numerical method involves analysis of wave propagation, such as the so called beam propagation method described by R. Marz in *Integrated Optics: Design and Modelling* (Adech House, 1994), or alternatively a coupled mode analysis.

In step 120, optimize the filter performance by analyzing the performance obtained in step 118, making small adjustments in the device parameters, and rerunning the numerical analysis of step 118 until a satisfactorily optimal filter performance has been obtained.

SPECIFIC DESIGN PROCEDURE

The above procedure is somewhat general. The following will give a more particular design procedure for the case of a flat-topped filter function using the MMI at the input to provide a two-fold image to the coupling region 54.

In accordance with step 110, a simple model for the filter function $F(\lambda)$ is the sum of two equal, laterally displaced gaussians $$F(\lambda) \propto \exp\left(-\frac{(\delta\lambda - \Lambda_{sepn}/2)^2}{\Delta\lambda_{filter}^2}\right) + \exp\left(-\frac{(\delta\lambda + \Lambda_{sepn}/2)^2}{\Delta\lambda_{filter}^2}\right), \quad (12)$$

where $$\delta\lambda = \lambda - \lambda_o \quad (13)$$

and $\lambda_o$ is the center wavelength of the filter.

For a given device dispersion, $$\eta = \frac{\delta x}{\delta\lambda}, \quad (14)$$

the filter response in the spatial domain is given by $$F(x) \propto \exp\left(-\frac{(x - X_{sepn}/2)^2}{\Delta x_{filter}^2}\right) + \exp\left(-\frac{(x + X_{sepn}/2)^2}{\Delta x_{filter}^2}\right), \quad (15)$$

where $$\Delta x_{filter} = \eta \cdot \Delta\lambda_{filter} \quad (16)$$

and $$X_{sepn} = \eta \cdot \Lambda_{sepn} \quad (17)$$

and x is measured from the center of the filter waveguide.

The filter function $F(\lambda)$ has a substantially flat top when the separation $\Lambda_{sepn}$ between the centers of the two gaussian waveforms lies in the approximate range $\sqrt{2}$ to $1.1 \cdot \sqrt{2}$ times the $\Delta\lambda_{filter}$. We will take the condition $$\Lambda_{sepn} = \sqrt{2} \cdot \Delta\lambda_{filter}. \quad (18)$$

This relationship is expressed in the spatial domain as $$X_{sepn} = \sqrt{2} \cdot \Delta x_{filter}. \quad (19)$$

In accordance with step 112, other constraints can be introduced into the model at this point. For example, it may be desired to construct the demultiplexer with a certain output waveguide, the form of which will determine the profile of the output guide mode, $\phi_g(x)$.

In accordance with step 114, the field profile $\phi(x)$ at the entrance to the output guide is determined by deconvolving $\phi_g(x)$ from $F(x)$. If $\phi_g(x)$ is also approximated by a gaussian $$\phi_g = \exp\left(-\frac{x^2}{\xi_{output-guide}^2}\right), \quad (20)$$

the deconvolution may be performed analytically, yielding $$\phi_0(x) = \quad (21)$$

$$\exp\left(-\frac{\left(x - \frac{X_{sepn}}{2}\right)^2}{\xi_{image}^2}\right) + \exp\left(-\frac{\left(x + \frac{X_{sepn}}{2}\right)^2}{\xi_{image}^2}\right),$$

where $$\xi_{image}^2 = \Delta x_{filter}^2 - \xi_{output-guide}^2. \quad (22)$$

If the dispersion element is structured and situated such that there is perfect 1:1 imaging of the field profile $\phi_{MMI}(x_{MMI})$ at the end of the MMI to the image plane at the entrance to the output guide, to thus correspond to $\phi(x)$, the MMI field profile is then given by $$\phi_{MMI}(x_{MMI}) \propto \exp\left(-\frac{\left(x_{MMI} - \frac{X_{MMI,sepn}}{2}\right)^2}{\xi_{image}^2}\right) + \quad (23)$$

$$\exp\left(-\frac{\left(x_{MMI} + \frac{X_{MMI,sepn}}{2}\right)^2}{\xi_{image}^2}\right),$$

where $x_{MMI}$ denotes the lateral coordinate at the end of the MMI and may be measured from the center line of the MMI.

In accordance with step 116, the input guide and MMI are then constructed to provide the appropriate values for $\xi_{image}$ and $X_{MMI,sepn}$. This is achieved by engineering the MMI to provide at the output of the MMI a two-fold image of the input guide field $\phi_{input-guide}$. Assuming perfect imaging by the MMI, the input guide width is simply adjusted to provide a guide mode with a width of $\xi_{image}$, that is, $$\xi_{input-guide} = \xi_{image}. \quad (24)$$

The MMI width $W_{MMI}$ is adjusted to provide the two-fold images of the input guide separated by $X_{MMI,sepn}$, which requires in the high-confinement approximation that $$W_{MMI} = 2 X_{sepn}. \quad (25)$$

The MMI length $L_{MMI}$ is adjusted to give two-fold imaging, that is, $$L_{MMI} = L_2 = \frac{3L_\pi}{8}. \quad (26)$$

In the above deconvolution, the demultiplexer dispersion and output guide structure were used as a starting point to determine the structures of the input guide and MMI necessary for a particular filter function. It is often, however, preferable to start with identical input and output waveguides and from these to determine the required device dispersion and MMI parameters necessary for the filter function. For a 1:1 filter imaging system, this alternative process gives $$\xi_{output-guide}^2 = \xi_{input-guide}^2 = \frac{\Delta x_{filter}^2}{2} \quad (27)$$

Thus, $$\xi_{output-guide}^2 = \xi_{input-guide}^2 = \frac{\eta^2 \cdot \Delta\lambda_{filter}^2}{2} = \frac{\eta^2 \cdot \Lambda_{sepn}^2}{2f^2}, \quad (28)$$

where f is the chosen ratio between the separation $\Lambda_{sepn}$ and the widths $\Delta\lambda_{filter}$ of the two gaussian components comprising the filter function, and where $\Lambda_{sepn}$ is the chosen wavelength range corresponding to the spacing of the two functional components. The required dispersion is thus given by Equation (28). With the dispersion set according to Equation (28), the MMI parameters are also determined and are given by the same functional form as above, that is, $$W_{MMI} = 2 \cdot X_{sepn} = 2 \cdot \eta \cdot \Lambda_{sepn}. \quad (29)$$

within the high-confinement approximation.

In accordance with step 118, the propagation of a guided mode entering the designed MMI from the input guide is modeled by a wave analysis such as a BPM simulation and the mode field at the output is determined and then coupled directly into the output guide for different offsets between the center lines of the MMI guide and the output waveguide. This procedure models the filter function of the demultiplexer generated as the 1:1 imaged field is dispersed across the output waveguide.

In accordance with step 120, it may be necessary to modify certain parameters of the input guide or MMI in order to optimize the filter function to achieve the desired characteristics.

A possible reason for such modification might be that the input guide mode field is not well imaged at the output of the MMI. Such poor imaging may occur if the MMI cannot support a sufficient number of guided modes. The quality of the image can be improved by increasing the MMI width $W_{MMI}$, but, in order to preserve the form of the filter function, increasing the MMI width, which increases the value of the separation $X_{sepn}$, typically necessitates a corresponding increase of the device dispersion and an increase of the width of the input guide. The width of the input guide can readily be increased without changing the width of the same guide in the remainder of the optical integrated circuit by introducing a simple adiabatically widening taper of the guide width just prior to the MMI section.

Another reason why the filter performance predicted from the numerical simulation may differ from the desired filter function might be that the MMI width $W_{MMI}$ does not yield the required spacing $X_{sepn}$ between the two-fold images, that is, $W_{MMI} \neq 2X_{sepn}$. Such a variance can occur when the waveguide modes of the MMI are not well confined within the core of the MMI, such as might occur when the lateral index contrast between the index of the MMI core and its cladding is small. In this case, the peaks of the two-fold image are separated by more than half the MMI width. This situation can be easily determined from the mode propagation analysis and be simply corrected by decreasing $W_{MMI}$ to provide the correct separation $X_{sepn}$ of the peaks of the two-fold image. Alternatively the width of the single-mode input guide can be increased, along with the filter dispersion, with a consequent minor change in the coupled modal output power.

EXEMPLARY DESIGN 1

A first specific design involves an InP-based arrayed waveguide demultiplexer that separates wavelength channels spaced at 1.6 nm in the 1.5 μm band associated with silica optical fiber. The single-mode input and output waveguides each consisted of a core of InCaAsP lattice-matched to InP and having a bandgap wavelength of 1.25 μm surrounded by a thick cladding of InP. These materials produce an index of refraction at the wavelength of interest that is substantially equal to 3.356 in the core and 3.167 in the cladding. Consideration of efficient coupling to a conventional single-mode fiber determines the selection of a core size of 0.21 μm in the transverse direction by 31 μm in the lateral direction. A flat-topped filter response is required.

Modal analysis shows that the lateral modal field was well approximated by a gaussian with width 1.8 μm. Since the input and output waveguides have the same modal fields, $\xi_{input-guide} = \xi_{output-guide}$, Equations (22) and (24) show that $\Delta x_{filter} = 1.8\sqrt{2}$ μm. Using Equation (19) for a flat-topped filter function gives $X_{sepn} = 3.6$ μm.

If Equation (25) is accurate, then an MMI coupler width $W_{MMI}$ of 7.21 μm is suggested. However, analysis by beam propagation method simulation shows that a 7.21 μm-wide MMI gives a somewhat larger two-fold image separation due the relatively weak mode confinement. The difference can be eliminated by decreasing $W_{MMI}$ to 6.21 μm.

Alternatively, the input mode width $\xi_{input-guide}$ can be increased by, for example, flaring the end of the input waveguide from 3.0 μm in width to about 5.0 μm in order to accommodate the larger value of $X_{sepn}$. For either case, beam propagation simulation or modal analysis allows $L_{MMI}$ to be evaluated. For an MMI coupler with $W_{MMI}$ of 6.2 μm, $L_{MMI}$ is determined to be approximately 58 μm. For this case, setting the dispersion of the filter to be 7.2 μm/nm assures that the separation between the two gaussian components of the filter transmission is 0.5 nm and that spacing the input waveguides by ~11.5 μm in the focal plane assures a filter channel spacing of 1.6 nm.

The performance of the finalized filter design is computed by a beam propagation simulation of the input guide mode propagating through the MMI coupler and coupling directly to the output waveguide, the coupling efficiency being determined by an overlap integral calculation evaluated for different displacements of the MMI center line with respect to the center line of the output guide. It is found that a flat-topped filter response is obtained, in line with expectations.

A practical alternative to the flat-topped filter above with $f=\sqrt{2}$ is obtained by setting f to a slightly larger value, say, $f=1.1\cdot\sqrt{2}$. Such a filter has a relatively wider central region, but it also shows a small dip at the passband center because the two component gaussians are now slightly more separated from the flat-band position described by $f=\sqrt{2}$. Such a filter may be advantageous when a central portion of the filter passband needs to be maximized and the small modulation of the transmission at the filter center is not detrimental to system performance.

EXEMPLARY DESIGN 2

A second specific design involves an InP-based arrayed waveguide demultiplexer that separates wavelength channels spaced at 1.6 nm in the 1.5 μm band associated with silica optical fiber. The single-mode input and output waveguides each consist of a core of InGaAsP lattice-matched to InP and having a bandgap wavelength of 1.0 μm surrounded by a thick cladding of InP. These materials produce an index of refraction at the wavelength of interest substantially equal to 3.218 in the core and of 3.167 in the cladding. Consideration of bend losses and modal structure leads to a choice of a core that is 2 μm thick and 2 μm wide for both the input and output guides.

The same guide core structure is used for the waveguides in the array 96, where the square cross section assures equivalence of the TE and TM mode indices and consequently renders the filtering operation independent of the polarization state of the incident light.

Modal analysis of the guides shows that the fundamental mode may be approximated by a gaussian of width of 1.3 μm. For a flat-topped filter, where $f=\sqrt{2}$, Equations (19), (22), and (24) then give $X_{sepn}=2.6$ μm. If Equation (25) is accurate, then an MMI coupler width of 5.2 μm is suggested. Modal analysis and beam propagation method indicates that for this width of MMI coupler, $L_2=41$ μm.

Performing a beam propagation method simulation of this structure, with a 2 μm-wide input guide and a 5.2 μm-wide MMI coupler, reveals that the two-fold image centers are separated by 3.1 μm, greater than the 2.6 μm suggested because of the relatively weak mode confinement within the MMI. Decreasing the value of $W_{MMI}$ is not effective in sufficiently reducing the value of $X_{sepn}$ and also decreases the light confinement within the MMI. The input guide width may, however, be increased, so that Equation (11), (22), and (24) are satisfied with $X_{sepn}=3.1$ µm. Using the same 2 µm-wide output waveguide, this suggests a gaussian input mode with width $\xi_{input-guide}$ of 1.8 µm. Such a mode is approximated by a 3.0 µm-wide input guide.

A demultiplexer filter with a 3.0 µm-wide input guide and an MMI coupler with $W_{MMI}=5.2$ µm and $L_{MMI}=41$ µm are thus indicated to provide a flattened filter response. Setting the filter dispersion to be 6.2 µm/nm provides a filter function with the 0.5 nm wavelength separation between the centers of the two filter component gaussians and provides for wavelength demultiplexing of channels spaced at 1.6 nm if the output guides are spaced 10 µm apart. Filter response simulation using beam propagation simulation of the input guide mode through the MMI coupler and coupled directly into the output guide as the latter are displaced with respect to each other shows that the predicted flat-topped filter response is achieved.

As described for the first exemplary design above, the flat-topped filter design may also be broadened somewhat, at the sacrifice of a small reduction of the filter transmission at its center.

FABRICATION

The fabrication of an array waveguide demultiplexer is well known but will be shortly summarized for our procedure. The procedure will be illustrated for the semiconductor materials in which the guides are formed of the InGaAsP system.

Organo-metallic chemical vapor deposition (OMCVD) is used to deposit on an InP substrate an InP buffer layer followed by the InGaAsP core layer. The InGaAsP acts as the waveguide core while the InP acts as the cladding. A silica mask layer is deposited, photolithographically patterned for the arrayed waveguide demultiplexer, and patterned with an oxygen plasma dry etch to form the silica mask. The quaternary layer is dry plasma etched with either a $CH_4/H_2$ mixture or a chemically assisted plasma directed ion-beam etch, for example, using a chlorine-assisted xenon ion etch. The remaining masking material is removed in an HF solution. The upper cladding layer of InP is then deposited to a thickness sufficient to fill the lateral spaces between waveguides and to assure negligible field tails at the chip surface. The device is thinned and cleaved to allow light to coupled onto and off the chip.

Device performance can be examined by passing light from a tunable-wavelength laser through the demultiplexer and measuring the intensity of transmitted light as a function of wavelength.

EXPERIMENTAL RESULTS

A demultiplexer was fabricated and tested. Its design generally conformed to the above first exemplary design with a 3.0 µm input guide, $W_{MMI}=6.0$ µm $L_{MMI}=54$ µm, and with an output dispersion of 12.5 µm/nm. The layers were deposited by OMCVD.

The filter function was designed to provide two overlapping gaussians separated by ~1.5 times their widths, and this separation was designed to correspond to a wavelength dispersion of 0.5 nm. This filter function was found experimentally to have a small dip of ~0.4dB at its center and to have a −3dB width of ~0.95 nm and a −20 dB width of ~1.6 nm. These values agree closely with a simulation of this structure with $W_{MMI}=6.0$ µm, using a beam propagation analysis of the input guide mode passing through the MMI coupler and the emergent field being coupled into the output guide as it is dispersed across the entrance of the output guide according to the filter dispersion.

ALTERNATIVE MATERIALS

The above examples involved a III-V semiconducotr material system based InP. This material system is of great interest for advanced opto-electronics, but the invention can be applied to other material systems. Other III-V semiconductors have been used in opto-electronics and can thus be utilized in the invention. Silicon and yet other semiconductors can be used depending on the desired operation wavelength range.

Indeed, the invention is not limited to semiconductor waveguides since many aspects of the invention involve only passive optical waveguides. Two of the most commercially important classes of waveguides are silica waveguides and polymer waveguides. Lithium niobate and associated perovskite materials are also important.

The guiding structure in silica waveguides can be buried planar waveguides and rib guides, the latter having substantially square cross sections. Silica glass waveguides can be deposited on a variety of substrates, including silicon, quartz, various ceramics, and sapphire. Typical thicknesses are 5 to 10 µm for the guidecore layer, 20 µm for the the lower cladding when the guide is not formed on a silica substrate, and 40 µm for the upper cladding.

A number of different fabrication processes have been developed. The two most currently popular methods are flame hydrolysis and plasma-enhanced chemical vapor deposition (PECVD). In a typical process, a thick bottom buffer layer of undoped silica is deposited. Then, the guidecore layer is deposited of silica that is doped to increase its refractive index. Many different dopants may be used to increase the index of silica, for example, germania or phosphorous. An index contrast of less than 2% is typical, with 0.3% to 0.7% being most popular. The guide pattern is them formed in the core layer by dry plasma etching through to the buffer layer. Finally, the upper silica cladding layer is deposited.

R. Syms provides a general description of silica waveguide deposition technologies in "Silica-on-silicon Integrated Optics," *Advances in Integrated Optics*, eds. S. Martellucci et al. (Plenum, 1995, ISBN 0-3-6-44833-5), chap. 7. Mottier describes a PECVD process in "Integrated Optics at the Laboratoire d'Electronique, de Technologie et d'Instrumentation," *International Journal of Optoelectronics*, vol. 9, pp. 125–135. The articles by Tachikawa et al., Suzuki et al., Okamoto et al., and Ishida et al. cited below all involved silica technology for arrayed waveguide filters.

Polymer waveguides are becoming increasingly popular because of their low cost. The technology has been reviewed by B. Booth in "Optical Interconnection Polymers", *Polymers for Lightwave and Integrated Optics: Technology and Applications*, ed. L. Hornak, (Marcel Dekker, 1993). Switching in polymer guides may be achieved by several techniques, including elecctro-optic modulators and interferometric switch structures.

APPLICATIONS

Figure 13:
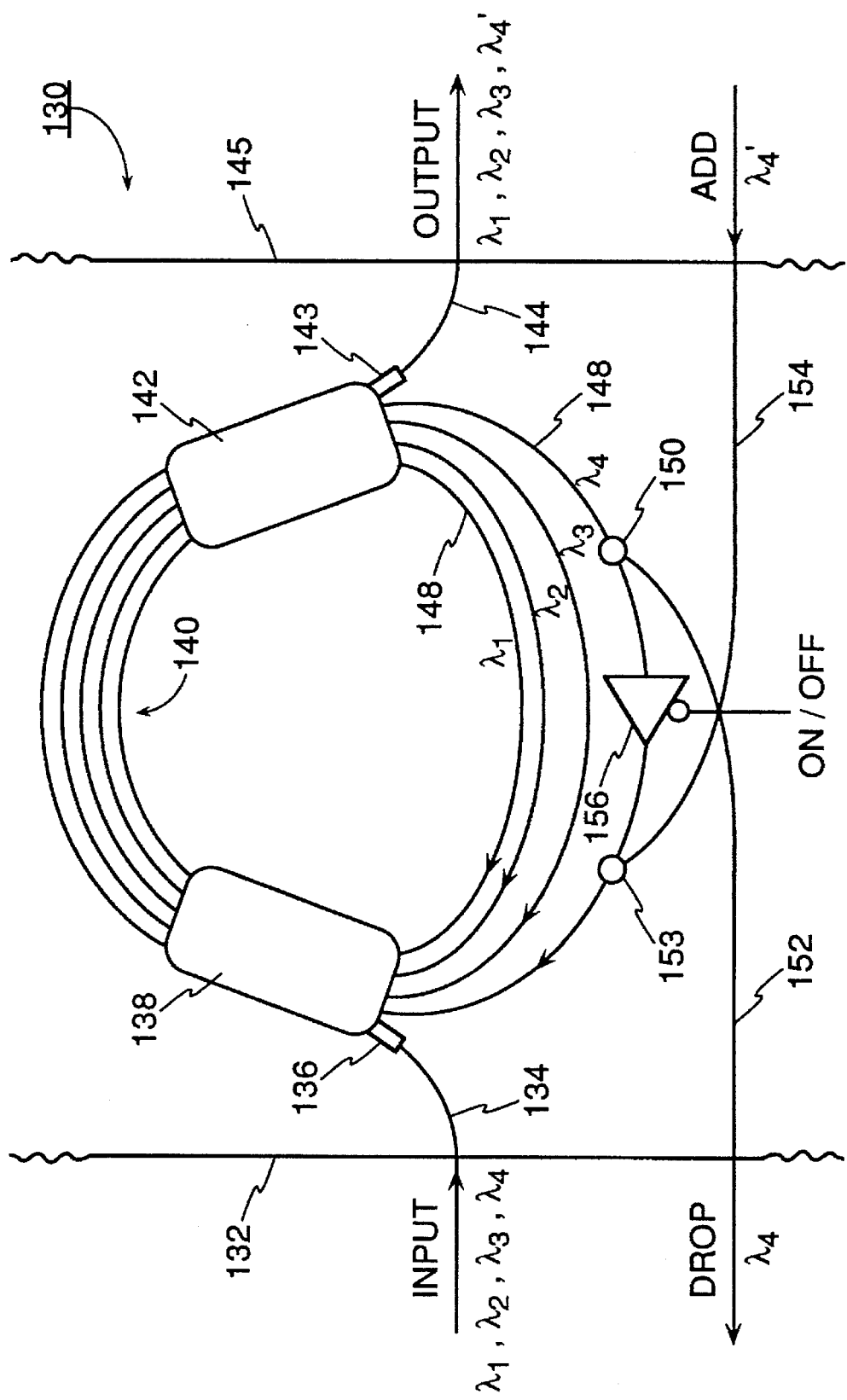
FIG. 13 is a schematic illustration of an add/drop circuit advantageously using the multi-mode filter of the invention.

The invention can be advantageously applied to many uses. An add/drop circuit 130 is schematically illustrated in FIG. 13. An input signal having wavelength components $\lambda_1$, $\lambda_2$, $\lambda_3$, and $\lambda_4$ is coupled from an optical fiber at a chip edge 132 to a single-moded input waveguide 134 on the chip. The input waveguide 134 is connected through a multi-mode interference filter 136 to a first star coupler 138, the outputs of which are the waveguides of an arrayed waveguide grating 140, which is also connected to the inputs of a second star coupler 142. There are five outputs of the second star coupler 142. One is an MMI 143 connected to a single-mode output waveguide 144 connected to an output fiber at another chip edge 145. The other four are single-moded feedback waveguides positioned on the second star coupler 142 to receive the respective wavelength components $\lambda_1$, $\lambda_2$, $\lambda_3$, and $\lambda_4$. Although illustrated for only one, each feedback waveguide 148 contains a splitter 150 coupling part of the optical signal to a drop waveguide 152 and a combiner 153 coupling an optical signal from an add waveguide 154. Each feedback waveguide 148 is connected at its output end to the input of the first star coupler 138 in parallel to the input waveguide 134 and its MMI 136. The output of each waveguide at the first star coupler 138 is positioned symmetrically with its respective input to the second star coupler 142.

A switchable amplifier 156 is disposed on the feedback waveguide 148 between the splitter 150 and combiner 153. When one wavelength channel $\lambda_4$ is to dropped and added, the amplifier 156 is turned off so as to act as an absorber. The channel $\lambda_4$ is then dropped and another channel $\lambda'_4$ of substantially equal wavelength is added. When that channel $\lambda_4$ is not to be dropped, the amplifier 156 is turned on to compensate for the losses introduced by the splitter 150 and combiner 153, and no signal is introduced through the add waveguide 154.

The splitter 150 and the combiner 153 may be passive Y-junctions. However, they can be replaced by active switches, such as Y-junction so-called digital optical switches, which may be activated by imposed bias fields or current injection. Active switches eliminate the need for the switchable amplifier 156.

The demultiplexed waveguides 148 are then fed to the first star coupler 138. From symmetry, it is clear that arrayed waveguides 140 multiplex the multiple optical carriers onto the output waveguides 143 and 144.

Figure 14:
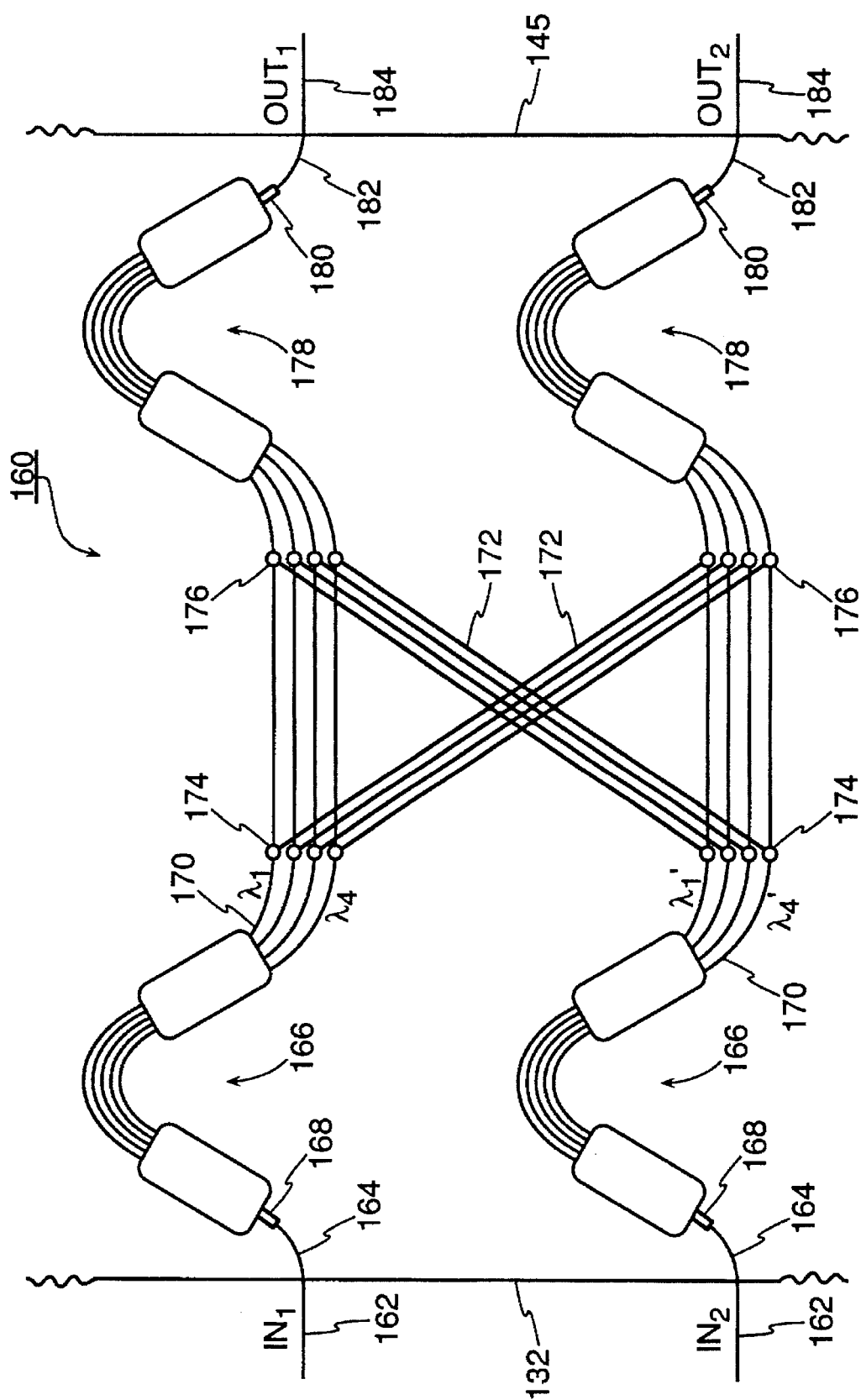
FIG. 14 is a schematic illustration of a cross-connect circuit advantageously using the multi-mode filter of the invention.

Another advantageous application of the invention is a 2×2 optical cross-connect switch 160 schematically illustrated in FIG. 14. Two optical fibers 162 input respective sets of optical input signals having respective wavelengths $\lambda_1$, $\lambda_2$, $\lambda_3$, $\lambda_4$ and $\lambda'_1$, $\lambda'_2$, $\lambda'_3$, $\lambda'_4$ to single-moded input waveguides 164 at the edge 132 of the chip. The waveguides 164 are connected to respective arrayed waveguide demultiplexers 166 through MMI filters 168. The outputs of the demultiplexers 166 are coupled to single-moded straight-ahead waveguides 170 bearing respective wavelengths $\lambda_1$, $\lambda_2$, $\lambda_3$, $\lambda_4$, and $\lambda'_1$, $\lambda'_2$, $\lambda'_3$, $\lambda'_4$. The two sets of straight-ahead waveguides 170 are pair-wise interconnected by a set of crossing waveguides 172 through routing switches 174 and 176. For a particular pair of wavelength $\lambda_i$ and $\lambda'_i$, the corresponding four routing switches 174 and 176 are together set to transfer the signals between the pair of straight-ahead waveguides 170 or to leave the signals on the same straight-ahead waveguides 170. The routing switches 174 and 176 can be functionally accomplished with so-called digital optical switches, as described by Vinchant et al. in "Low driving voltage or current digital optical switch on InP for multiwavelength system applications," *Electronics Letters*, 1992, pp. 1135, 1136 and based upon the operating principle described by Silberberg in U.S. Pat. No. 4,775,207. Alternatively, the routing function may be accomplished by passive splitters and combiners and the switchable amplifiers of FIG. 13, with the amplifiers inserted into each straight-ahead waveguide 170 and each crossing waveguide 172. Laube et al. have described such a routing switch in "Selective Area Growth of Q/Q-MQW Structures for Active/Passive 2×2 Space Switch Matrices," *Proceedings of 7th European Conference on Integrated Optics (ECIO '95)*, pp. 527–530, Apr. 3–6, 1995, Delft, Holland. The switched signals are then multiplexed in multiplexers 178, each having an MMI filter 180 interposed between its output and a single-moded output waveguide 182 coupled to an optical fiber 184 at the chip edge. All the waveguides in the switch 160 of FIG. 14 are effectively single-moded, except of course, in their MMI end portions. However, in practice, the waveguides may be allowed to be slightly double-moded provided that no significant signal is effectively carried by the higher-order modes. Such marginally confined higher-order modes are eliminated by bend-loss since they preferentially radiate away from curved portions of the waveguides and are lost. Bend loss allows the use of guides which are nominally able to suppod several modes but which transpod only the fundamental mode. Such multi-moded waveguides are often preferable because strictly singly moded waveguides are often too narrow for easy, tolerant lithography. In fact, the 3 μm-wide waveguides presented in the above experiment examples actually support more than one mode. The guide would need to be less than 1.7 μm-wide to be truly single-moded. In addition, the guide core of the second exemplary design would also need to be a little thinner in the transverse direction to be strictly single-moded. However, if one launches all modes into such marginally multi-moded waveguides it and then examines the guided light after the guide has undergone a significant angular turn, only the fundamental mode is observed. For purposes of the claims, these substantially single-mode waveguides will be referred to as single-mode waveguides since overall they effectively operate as if they were single-moded.

Figure 15:
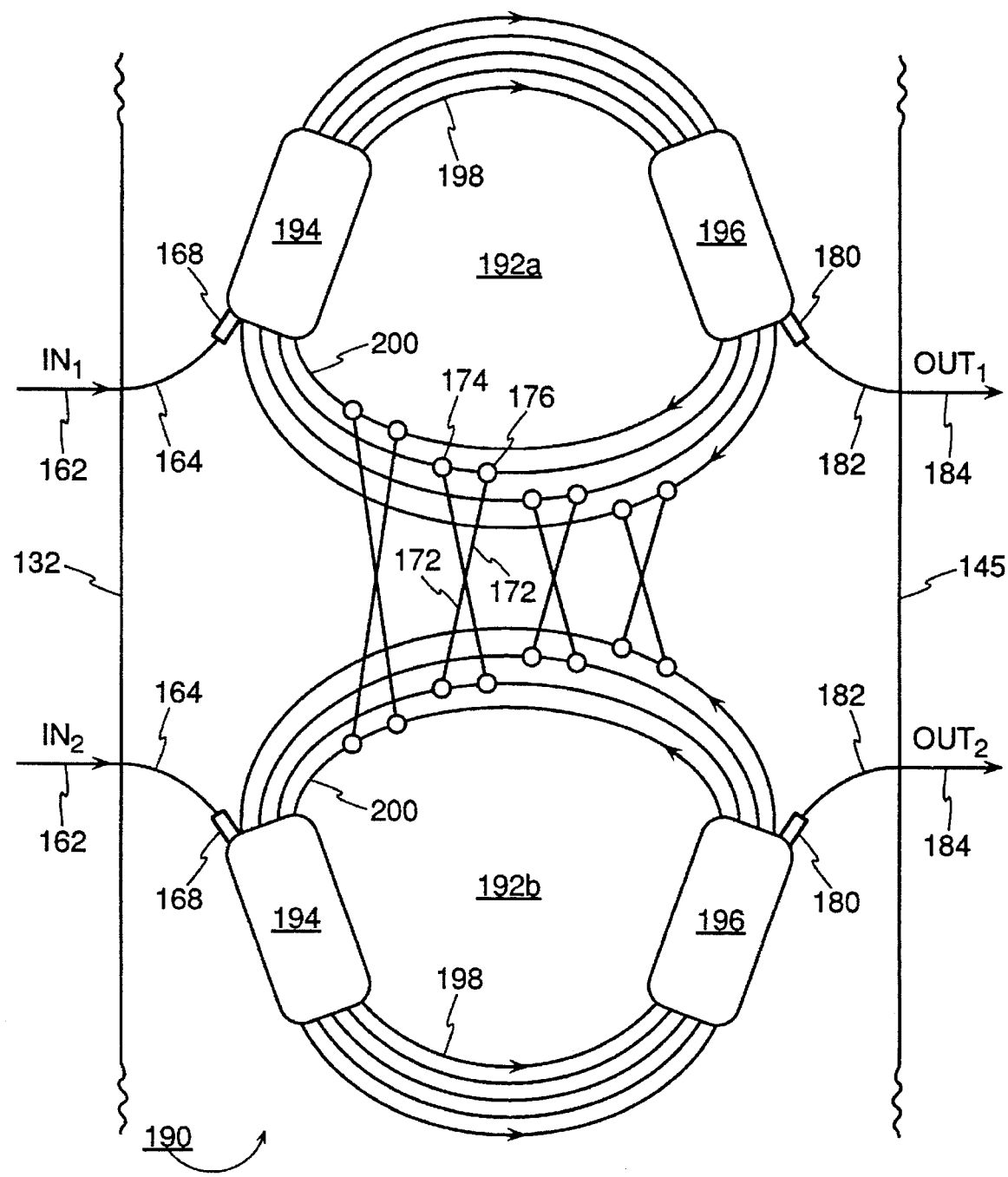
FIG. 15 is a schematic illustration of an alternative cross-connect circuit more compact than that of FIG. 14.

A compact version of the cross-connect switch 160 of FIG. 14 is the 2–2 cross-connect switch 190 of FIG. 15, which incorporates some of the feedback structure of FIG. 13. Similarly to the larger cross-connect switch 160, optical input signals of multiple wavelengths are received on the single-moded input fibers 162 and are directly coupled at the edge 132 of the chip to the single-moded input waveguides 164. These input waveguides 164 are coupled through the respective MMI's 168 to respective arrayed waveguide demultiplexers 192a and 192b, each having first and second optical interaction regions 194 and 196, plural grating waveguides 198, and plural feedback waveguides 200, similar to the waveguides 148 of FIG. 13.

A multi-wavelength signal on fiber 162 and input waveguide 164, after passing through the MMI 168, is wavelength dispersed by the optical interaction regions 194 and 196 and the grating waveguides 198 into separated wavelength channels on the feedback waveguides 200. Assuming no further switching, these same wavelength-separated signals are again input from the feedback waveguides 200 back into their respective first optical interaction regions 194 (in parallel to the input MMIs 168), the grating waveguides 198, and the second optical interaction regions 196 to be finally output, via the respective output MMIs 180 (in parallel to the feedback guides 200) and the output waveguides 182, to the respective output fibers 184. The same operation is occurring in the upper and lower demultiplexers 192a and 192b, that is, the signals input on $IN_1$, exit on $OUT_1$, and signals input on $IN_2$, exit on $OUT_2$, unless they have been exchanged between the two demultiplexers 192a and 192b.

However, corresponding ones of the feedback waveguides 200 in the two demultiplexers 192a and 192b are selectively linked by respective sets of interchange elements comprising crossing waveguides 172 and routing switches 174 and 176 so as to selectively interchange signals of a given wavelength channel between the two demultiplexers 192a and 192b. Activation of the interchange element for a particular carrier wavelength causes the signals of that wavelength to be interchanged between the two demultiplexers 192a and 192b, thereby performing the switching function.

Figure 16:
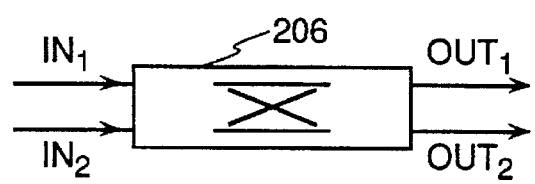
FIG. 16 is a schematic illustration of a 2×2 cross connect usable with the invention.

The routing switches may comprise active Y-junction digital optical switches activated, for example, by imposed bias fields or carrier injection, or other means, or may comprise passive Y-branch splitters followed by on/off amplifiers in a similar manner to elements 150, 153, and 156 of FIG. 13, or may comprise yet other means. The functionality of the interexchange elements may be represented by the schematic element 206 of FIG. 16. Importantly, such a switch 206 need not be wavelength selective although it may be optimized for the wavelength of the signal traversing the feedback waveguide 200 on which it is located. Such switches are well known.

Figure 17:
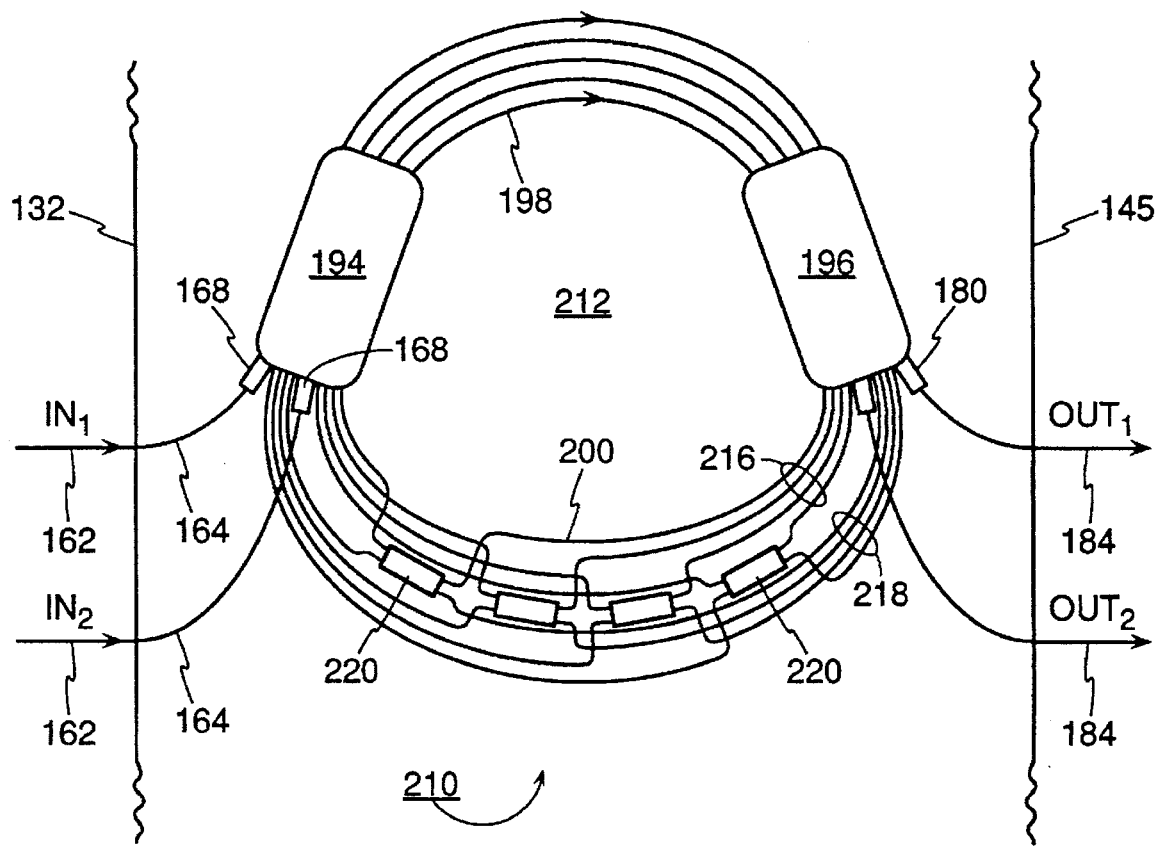
FIG. 17 is a schematic illustration of yet another cross-connect circuit even more compact that of FIG. 15.

The cross-connect switch 160 of FIG. 14 can be further condensed into a switch 210 shown schematically in FIG. 17 having a single demultiplexer 212. Both input waveguides 164 are connected through respective input MMIs 168 to a single first optical interaction region 194. The grating waveguides 198 connect the first and second optical interaction regions 194 and 196. Feedback waveguides 200 feed back signals from the second optical interaction regions 196 to the first optical interaction regions 194. However, as is clearly illustrated in FIG. 17, the number of feedback waveguides 200 is twice the number of wavelength channels because they separately convey the wavelength channels of the two separate inputs $IN_1$ and $IN_2$. The feedback waveguides 200 in a group 216 convey the wavelength channels demultiplexed from $IN_1$ while those in a group 218 convey the wavelength channels demultiplexed from $IN_2$. The feedback waveguides 200 and the input MMIs 168 or output MMIs 180 are arranged in parallel and in the respective groups 216 and 218 at the edges of the two interaction regions 194 and 196.

The corresponding channels or feedback waveguides 200 of the two groups 216 and 218 are connected through 2×2 optical cross connects 220 that selectively interchange the two connections between their inputs and their outputs. The functionality of the cross connects 220 are the same as the switch 206 of FIG. 16. The cross connects 220 can switch the separate wavelength channels derived from the inputs $IN_1$ and $IN_2$ between the outputs $OUT_1$ and $OUT_2$.

Although the cross-connect function in FIG. 17 for the individual wavelength channels has been combined into a single exchange element 220, it is recognized that separate switching functions 174 and 176 and connecting guides 172, as illustrated in FIG. 15, can be advantageously employed.

The embodiment of FIG. 15 has the advantage over that of FIG. 14 in that the device is smaller and filter variations are less troublesome, but it has the disadvantage the crosstalk is probably worse because out-of-band crosstalk from the input $IN_1$ or $IN_2$ can pass directly through the filters to the outputs $OUT_1$ and $OUT_2$ whereas, in the filter 160 of FIG. 14, the crosstalk must pass through two filter elements 166 and 178. This increase of crosstalk may, however, be obviated by using folded-back return pathways to the interaction regions 196 rather than the illustrated loop-back return pathways to the interaction regions 194, as previously disclosed, for example, by Ishida et al. in "Multichannel Frequency-Selective Switch Employing an Arrayed-waveguide Grating Multiplexer with Fold-Back Optical Paths," IEEE Photonics Technology Letters, vol. 6, pp. 1219–1221, 1994.

The cross-connect switch 210 of FIG. 17 has the advantage over cross-connect switches 160 and 190 of FIGS. 14 and 15 in that it is small and that the use of one set of arrayed guides 198 shows a unique filter function for signals input on $IN_1$ and $IN_2$.

The cross-connect switches 160 and 190 of FIGS. 14 and 15 include a large number of crossing waveguides. It is known that if they cross at moderately large angles, the loss and crosstalk are negligible.

Similar drop/add circuits or switches have been disclosed by Okamoto et al. in "16-channel optical add/drop multiplexer using silica-based arrayed-waveguide gratings," Electronics Letters, vol. 31, pp. 723, 724, 1995; by Tachikawa et al. in "Arrayed-waveguide grating add-drop multiplexer with loop-back optical paths," Electronics Letters, vol. 29, pp. 2133, 2134, 1993; by Suzuki et al. in "Multichannel optical wavelength selective switch with arrayed-waveguide grating multiplexer," Electronics Letters, vol. 30, pp. 1091, 1092, 1994; and by Ishida et al., ibid.

Figure 18:
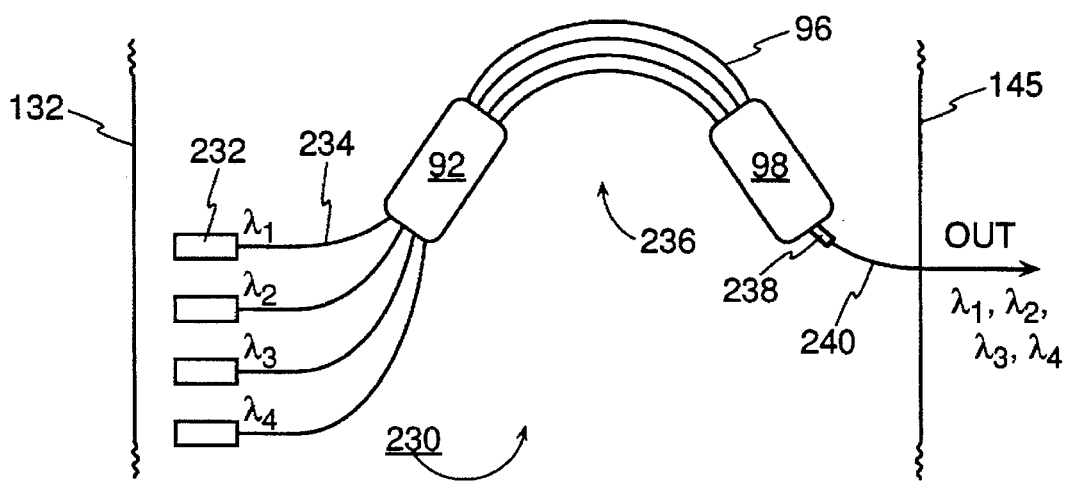
FIG. 18 is a schematic illustration of a multi-wavelength transmitter of the invention.

Another embodiment of the invention is a wavelength-division laser transmitter 230, illustrated schematically in FIG. 18. Several semiconductor lasers 232 are formed into an array of N lasers on a single chip, and each laser 232 is designed to emit at its respective and separate predetermined wavelength $\lambda_i$. Such lasers 232 are conventionally DFB (distributed feedback) or DBR (distributed Bragg reflector) lasers. Although unillustrated, each laser 232 is modulated by a respective data channel so that it outputs an optical carrier wave at $\lambda_i$ whose envelope is the data to be conveyed in that channel. The outputs can be combined on chip by an integrated combiner, that is, multiplexer. Such arrays of integrated lasers and combiner are well known, as have been described by Zah et al. in "Multiwavelength light source with integrated DFB laser array and star couplers for WDM lightwave communication," International Journal of High Speed Electronics and Systems, vol. 5, 1994, pp. 91–109 and by Young et al. in "A 16×1 WDM transmitter with integrated DBR lasers and electroabsorption modulators," IEEE Photonics Technology Letters, vol. 5, 1993, pp. 908–910. However, this prior art has combined the N channels in a single star coupler, which necessarily entails a power loss of 1/N. As a result, the prior art has often included an optical amplifier at the output to boost the level of the multiplexed signal.

Figure 10:
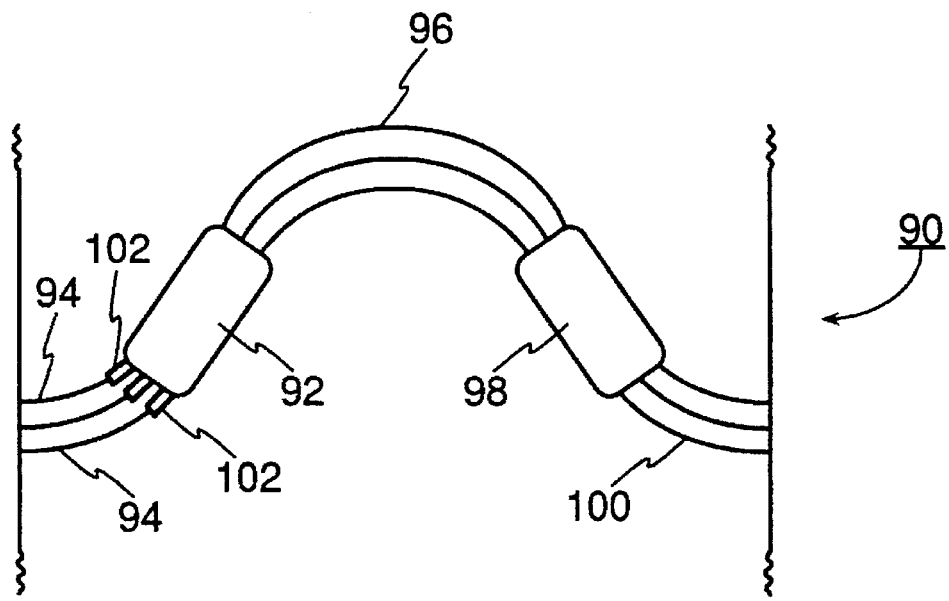
FIG. 10 is a plan view of a phased-array grating usable with the invention.

According to the present invention, the modulated outputs of array of lasers are conveyed on single-mode waveguides 234 to a multiplexer 236 comprising the first and second interaction regions 92 and 98 and grating waveguides 96, similar to corresponding elements in the filter 90 of FIG. 10. The single-mode waveguides 234 are directly connected to the first interaction region 92. An MMI coupler 238 is positioned on the output side of the second interaction region 94 to receive all the wavelength channels from the array of lasers 232. A single-mode waveguide 240 connects the MMI coupler 238 to an output fiber at the edge 145 of the chip or to other opto-electronics on the chip. In either case, the N optical channels have been combined into a single waveguide or fiber with low loss. Furthermore, it is known that it is difficult to precisely control the emission wavelengths $\lambda_i$ of the lasers 232. The flattened response of the multiplexer 236 provides a wider window in which the lasers 232 can operate, thus relaxing design and fabrication requirements.

The invention thus provides an easy solution to the generalized problem of frequency drift and other imprecisions in optical systems, particular WDM communication systems. A multi-mode interference coupler is easily incorporated into various wavelength dispersive optical functions to provide a flattened wavelength response. The invention can be advantageously incorporated into a number of useful optical communication systems.

What is claimed is:

1. An optical coupler, comprising:
   a plurality of single-moded optical waveguides optically connected to at least one optical interaction region; and
   at least one multi-mode interference filter disposed between a respective one of said single-moded optical waveguides and said interaction region and having a length to produce a multiple image at an end thereof.

2. The optical coupler of claim 1, wherein only some of single-moded optical waveguides are coupled to said optical interaction region through a respective one of said at least one multi-mode interference filter.

3. The optical coupler of claim 1, wherein at least one of said optical waveguides is disposed on an input end of said at least one interaction region and at least one other of said optical waveguides is disposed on an output end of said at least one interaction region.

4. The optical coupler of claim 1, wherein said at least one multi-mode interference filter has a length to produce a double-peaked image.

5. The optical coupler of claim 1, wherein said at least one multi-mode interference filter has a length to produce an image with more than two peaks.

6. The optical coupler of claim 1, wherein said multi-moded waveguide has a substantially constant width and can support at least three optical modes.

7. The optical coupler of claim 1, further comprising a wavelength dispersive element operatively associated with said optical interaction region, whereby said multi-mode interference filter presents a flattened response for light wavelength dispersed by said dispersive element.

8. The optical coupler of claim 1, wherein said waveguides and said multi-mode interference filter comprise III-V semiconductor materials.

9. The optical coupler of claim 1, wherein said waveguides and said multi-mode interference filter comprise silica.

10. The optical coupler of claim 1, wherein said waveguides and said multi-mode intereference filter comprise polymeric material.

11. An wavelength dispersive device, comprising:
    a first side comprising at least one substantially single-moded optical waveguide;
    a second side comprising a plurality of substantially single-moded optical waveguides;
    a frequency dispersive element optically coupling said waveguides between said first and second sides across at least one optical interaction region; and
    a multi-moded waveguide disposed on an end of at least one of said waveguides adjacent to said interaction region.

12. The wavelength dispersive device of claim 11, further comprising a plurality of additional optical waveguides coupling said first and second sides and conveying frequency-dispersed optical signals.

13. The wavelength dispersive device of claim 12, further comprising at least one selective switching element in said additional optical waveguides for switching out one of said frequency-dispersed optical signals and for switching in another optical signal.

14. An arrayed waveguide device, comprising:
    a first and a second optical interaction region;
    at least one first single-moded optical waveguide optically coupled to a first side of said first optical interaction region;
    a plurality of optical waveguides optically coupled between a second side of said first optical interaction region and a first side of said second optical interaction region and having respective phase lengths with predetermined differences therebetween;
    at least one second single-moded optical waveguide optically coupled to a second side of said second optical interaction region; and
    a multi-moded waveguide interposed between at least one of said first and second optical waveguides and a neighboring one of said first and second optical interaction regions.

15. The arrayed waveguide device of claim 12, wherein said multi-moded waveguide comprises a multi-mode interference filter having a length to produce a multiply peaked image on an end thereof.

16. An optical filter, comprising:
    at least one single-moded input waveguide;
    at least one single-moded output waveguide;
    at least one optical interaction region and a frequency dispersive element operatively connected thereto, receiving at least one optical input signal on said at least one input waveguide, and dividing said at least one input signal according to wavelength into said at least one output waveguide;
    at least one multi-mode interference filter disposed between one of said waveguides and said at least optical interaction region.

17. The optical filter of claim 16, wherein each said at least one optical interaction region comprises two optical interaction regions and an arrayed waveguide grating disposed therebetween.

18. A drop-add circuit, comprising:
    a single-mode input waveguide;
    a first multi-mode waveguide receiving signals from said input waveguide;
    a second mult-mode waveguide;
    a single-mode output waveguide receiving signals from said second multi-mode waveguide;
    a plurality of feedback waveguides;
    at least one optical interaction region receiving signals on a first side from said first multi-mode waveguide and first ends of said feedback waveguides and sending signals on a second side to said second multi-mode waveguide and second ends of said feedback waveguides;
    a frequency dispersive element operatively disposed in said at least one optical interaction region; and
    at least one interexchange element disposed on a respective one of said feedback waveguides, selectively interchanging an optical signal carried on said respective feedback waveguide for another optical signal.

19. The add-drop circuit of claim 18, wherein said at least one optical interaction region comprises two optical interaction regions and said frequency dispersive element comprises an arrayed waveguide grating disposed between said two optical interaction regions.

20. An optical switch comprising:
a first and a second wavelength dispersive system, each comprising:
at least one optical interaction region having a first side receiving an input signal on a substantially single-moded input waveguide and a second side from which an output signal is transmitted on a substantially single-moded output waveguide,
a waveguide dispersive element operatively associated with said at last one optical interaction region, and
a plurality of feedback waveguides linking said first and second sides; and
selective interexchange elements connected between pairs of said feedback waveguides of said first and second waveguide dispersive systems, and
wherein said input and output waveguides are single-moded and multi-mode interference filters are interposed between said at least one optical interaction regions and at least some of said input and output waveguides in each of said waveguide dispersive systems.

21. An optical switch comprising:
at least one optical interaction region receiving two input signals on a receiving side thereof and sending two output signals from a sending side thereof;
a wavelength dispersive element associated with said at least one optical interaction region;
plural feedback channels linking different respective positions on said sending side with corresponding positions on said receiving side;
selectively activable connections between said feedback channels; and
at least two multi-mode interference filters on at least one side of said at least one optical interaction region carrying respective ones of said input and output signals.

22. An optical switch comprising:
at least one optical interaction region receiving two input signals on a receiving side thereof and sending two output signals from a sending side thereof;
a wavelength dispersive element associated with said at least one optical interaction region;
plural feedback channels linking different respective positions on said sending side with corresponding positions on said receiving side;
selectively activable connections between said feedback channels;
respective substantially single-moded waveguides carrying said input and said output signals; and
at last one multi-moded waveguide disposed between said single-moded waveguides and said at least one optical interaction region.

23. The optical switch of claim 22, wherein said single-moded and said multi-moded waveguides are integrated on a chip.

24. A multi-wavelength laser source, comprising formed on a chip:
a plurality of semiconductor lasers emitting at a plurality of respective wavelengths;
a plurality of single-moded first waveguides receiving respective outputs of said semiconductor lasers;
at least one optical interaction region receiving said single-moded first waveguides;
a wavelength dispersive element coupled to said at least one optical interaction region;
a single-moded second waveguide receiving an output of said at least one optical interaction region; and
at least one multi-moded waveguide coupled between one of said waveguides and said at least one optical interaction region.

25. The multi-wavelength laser source of claim 24, wherein said multi-moded waveguide is disposed between said second waveguide and said at least one optical interaction region.

26. The multi-wavelength laser source of claim 24, wherein said multi-moded waveguide is of a length to comprise a multi-mode interference filter.

27. The multi-wavelength laser source of claim 24, wherein said at least one optical interaction region comprises two optical interaction regions linked by a plurality of waveguides having predetermined differences in phase lengths therebetween.

28. A 2×2 optical switch for switching signals between either a first or a second single-moded input optical waveguiding means and a first or a second single-moded output optical waveguiding means, said switch comprising
a first and a second demultiplexer and a first and a second multiplexer,
a plurality of multiple-mode interference couplers individually connecting said first and second input optical waveguiding means to said first and second demultiplexers and said first and second multiplexers to said first and second output waveguiding means, respectively,
a plurality of first single-mode waveguides connecting said first demultiplexer to said first multiplexer,
a plurality of second single-mode waveguides means connecting said second demultiplexer to said second multiplexer,
crossing waveguides between said first and second waveguiding means, and
routing switch means for connecting said crossing waveguides to said first and second waveguides.

29. The optical switch in accordance with claim 28 wherein each of said multiplexers and demultiplexers comprises a first and a second interaction region interconnected by optical grating means.

30. The optical switch in accordance with claim 29 wherein said multiplexers, demultiplexers, waveguides, and multiple-mode interference couplers are formed on a single chip.

31. A 2×2 optical switch for switching signals between either a first or a second single-moded input optical waveguiding means and a first or second single-moded output optical waveguiding means, said switch comprising
first optical interaction means for each of said input waveguiding means,
second optical interaction means for each of said output waveguiding means,
a first and a second plurality of grating waveguides inter-connecting said first and second interaction means,
a plurality of multiple-mode interference couplers individually connecting each of said interactions means to its waveguiding means,
a first and a second plurality of feedback waveguides inter-connected between said first and second interaction means, and routing switch means for interconnecting individual ones of said feedback waveguides of said first and second pluralities.

32. A 2×2 optical switch for switching signals between either a first or a second single moded input optical waveguiding means and a first or a second single-moded output optical waveguiding means said switch comprising a first and a second interaction region, multiple-mode interference couplers connecting said first interaction region individually to the first and second single-moded input waveguiding means and connecting said second interaction region individually to the first and second single-moded output waveguiding means, grating waveguides connecting said first and second interaction regions, feedback waveguides connecting said first and second interaction regions, and optical cross-connects connecting individual pairs of said feedback waveguides.

33. The optical switch in accordance with claim 32 wherein said interaction means, grating waveguides, feedback waveguides, optical cross connects, and multiple-mode interference couplers are formed on a single chip.

34. A 2×2 optical switch for switching signals between either a first or a second single-moded input optical waveguiding means and a first or a second single-moded output optical waveguiding means, said switch comprising, first means defining a first path between the first input waveguiding means and the first output waveguiding means and including a first plurality of single-mode wave guides, second means defining a second path between the second input waveguiding means and the second output waveguiding means and including a second plurality of single-mode wave guides, each of said first and second means including a pair of multiple mode interference couplers, a demultiplexer and a multiplexer, and means for selectively interconnecting individual ones of said first and second pluralities of single-mode waveguides.

35. The optical switch in accordance with claim 34 wherein one of said multiple mode interference couplers is connected between the input waveguiding means and said demultiplexer and a second of said multiple mode interference couplers is connected between the output waveguiding means and the multiplexer in each of said first and second paths.

36. A 2×2 optical switch for switching signals between either a first or a second single-moded input optical waveguiding means and a first or a second single-moded output optical waveguiding means, said switch comprising first means defining a first path between the first input waveguiding means and the first output waveguiding means and including a first plurality of single-mode wave guides, second means defining a second path between the second input waveguiding means and the second output waveguiding means and including a second plurality of single mode wave guides, each of said first and second means including a pair of multiple mode interference couplers and a first and a second optical interactions means, and means for selectively interconnecting individual ones of said first and second pluralities of single-mode waveguides.

37. The optical switch in accordance with claim 36 wherein one of said multiple mode interference couplers is connected between the input waveguiding means and said first optical interaction means and a second of said multiple mode interaction coupler is connected between the output waveguiding means and said second optical interaction means in each of said first and second paths.

38. The optical switch means in accordance with claim 36 wherein said first and second plurality of single-mode waveguides comprise feedback waveguides and wherein grating waveguides also interconnect said optical interaction means in each of said first and second paths.

39. A wavelength-division laser transmitter comprising a
plurality of semiconductor lasers in an array and each designed to emit at its respective and predetermined wavelength, a multiplexer, individual single-mode waveguides connecting each of said lasers to said multiplexer, a single-mode output waveguide, and a multi-mode interference coupler connecting said multiplexer to said output waveguide.

40. A wavelength-division laser in accordance with claim 39 wherein said multiplexer includes first and second interaction regions interconnected by optical grating means.

41. A wavelength-division laser in accordance with claim 40 wherein said optical grating means comprises a plurality of waveguides, the phase lengths of adjacent waveguides differing from each other to form an optical grating.

42. A wavelength division laser transmitter in accordance with claim 41 wherein said plurality of semiconductor lasers, said multiplexer, said optical grating means, and said output waveguide are formed on a single chip.

43. A wavelength-division laser transmitter comprising a plurality of semiconductor lasers in an array and each designed to emit at its respective and predetermined wavelength, a single-mode output waveguide, and a plurality of series paths connecting said lasers to said output waveguide, said paths each including an individual single-mode waveguide connected to each of said lasers, a multi-mode interference coupler, and a multiplexer.

44. The wavelength-division laser transmitter in accordance with claim 43 wherein said multiplexer is common to all of said paths and said multi-mode interference coupler connects said multiplexer to said output waveguide.

45. The waveguide-division laser transmitter in accordance with claim 43 wherein said plurality of lasers and said plurality of series paths are formed on a single chip.

* * * * *